(12) United States Patent
Spencer et al.

(10) Patent No.: US 6,257,718 B1
(45) Date of Patent: Jul. 10, 2001

(54) CLIP-ON SUNGLASSES WITH BRIDGE MOUNTING

(75) Inventors: Jack N. Spencer, Plymouth, MN (US); Charles Heck, Cranford, NJ (US)

(73) Assignee: Made in the Shades Optical, Inc., Minnetonka, MN (US)

( * ) Notice: Subject to any disclaimer, the term of this patent is extended or adjusted under 35 U.S.C. 154(b) by 0 days.

(21) Appl. No.: 08/936,904

(22) Filed: Sep. 25, 1997

Related U.S. Application Data

(63) Continuation-in-part of application No. 08/590,996, filed on Jan. 24, 1996, now Pat. No. 5,696,571.

(51) Int. Cl.[7] .................................................. G02C 9/00
(52) U.S. Cl. ................................................ 351/47; 351/57
(58) Field of Search ................................ 351/44, 47, 57, 351/124

(56) References Cited

U.S. PATENT DOCUMENTS

| 5,696,571 | * | 12/1997 | Spencer et al. | 351/47 |
| 5,724,118 | * | 3/1998 | Krebs | 351/47 |
| 5,867,244 | * | 2/1999 | Martin | 351/57 |

FOREIGN PATENT DOCUMENTS

| 37 34 649 A1 | 4/1989 | (DE) . |
| 0 194 065 | 9/1986 | (EP) . |
| 0 786 682 A3 | 8/1997 | (EP) . |
| WO 96/33440 | 10/1996 | (WO) . |
| WO 97/19384 | 5/1997 | (WO) . |

\* cited by examiner

*Primary Examiner*—Huy Mai
(74) *Attorney, Agent, or Firm*—Haugen Law Firm PLLP

(57) ABSTRACT

Clip-on type sunglasses include an improved mounting arrangement in which the bridge portion of the sunglass frame is adapted to fit behind the bridge of the eyeglasses on which the sunglasses are mounted, forming part of the mounting arrangement which also includes a pair of mounting clips. One mounting clip is located at the bottom of each eyewire, corresponding to the approximate middle of the lens, which receives the lower edges of the frame of the eyeglasses on which the sunglasses are mounted. Using the bridge portion of the sunglasses as part of the mounting arrangement eliminates the need for mounting clips on the upper portion of the sunglass frame. The bridge member of the sunglass frame contains a main portion and a central portion, the central portion having lower arms which are joined to form an angled member. The lower arms are connected to middle arms and upper arms which are attached to the eyewires. The angled member is oriented downwards in relation to the plane formed by the arms. The spacing of the bridge member from the back of the sunglass lenses and the orientation of the angled member enable the sunglasses to be used on a variety of eyeglass frames, including frames having single and double bridge elements. The sunglasses are attached and retained using the lower bridge, independently of the upper bridge of the eyeglasses, when they are used on eyeglasses having a double bridge style.

18 Claims, 12 Drawing Sheets

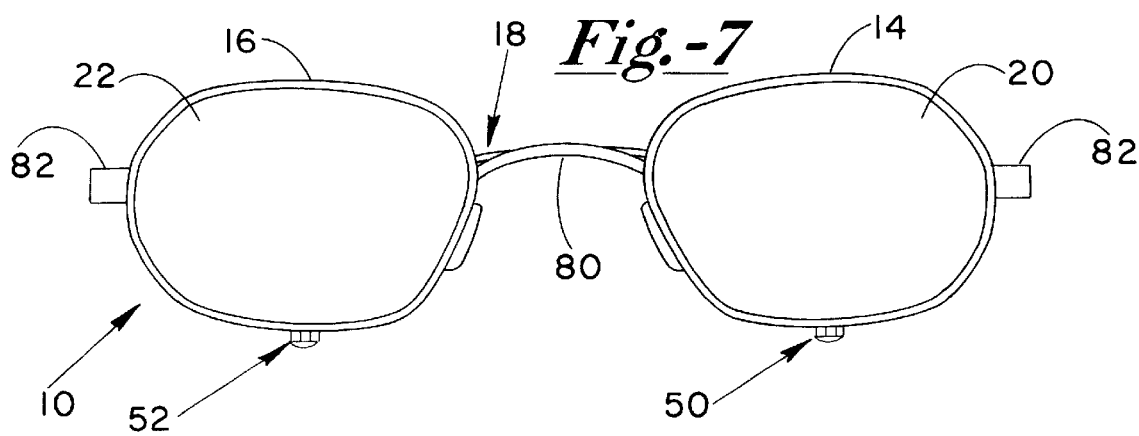
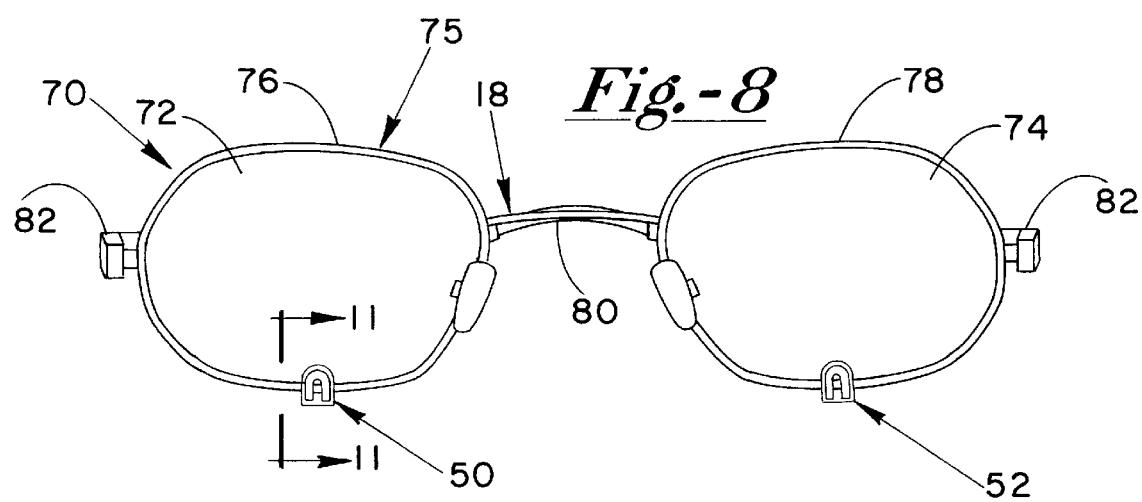

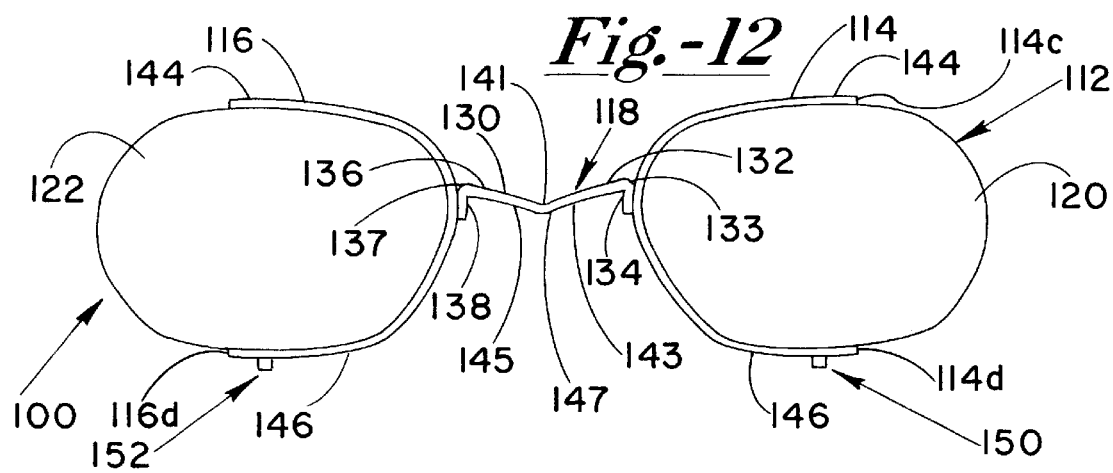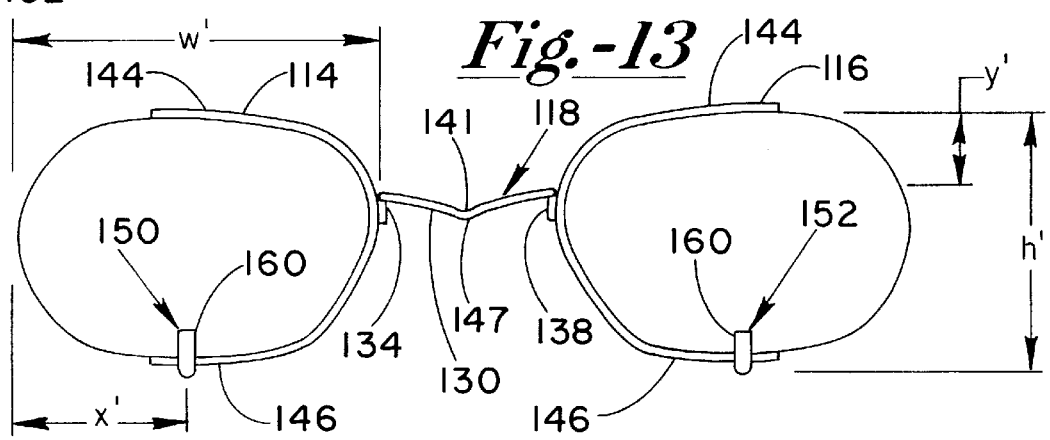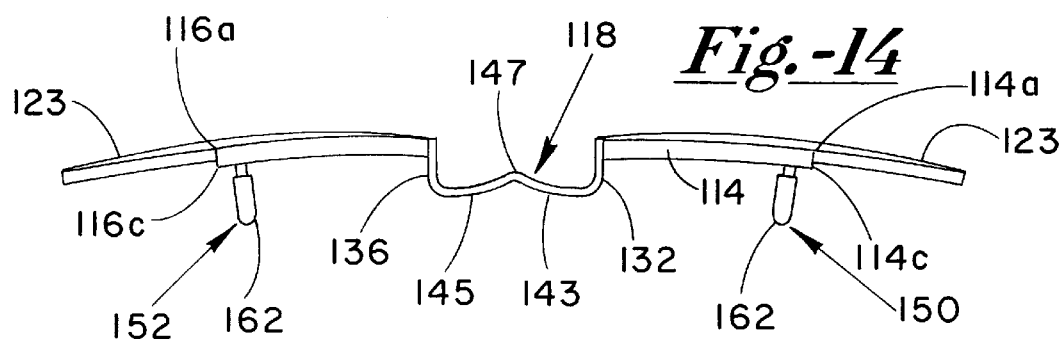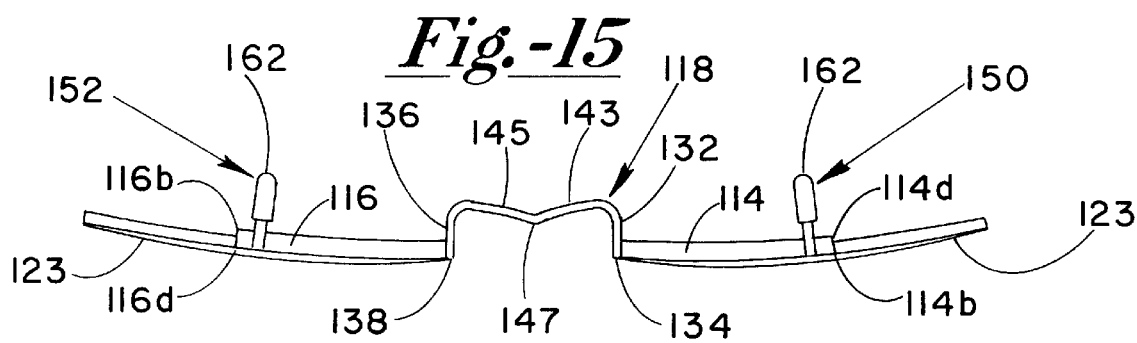

CLIP-ON SUNGLASSES WITH BRIDGE MOUNTING

CROSS-REFERENCE TO RELATED APPLICATIONS

This is a continuation-in-part of application Ser. No. 08/590,996 filed Jan. 24, 1996 now U.S. Pat. No. 5,696,571.

REFERENCE TO A "MICROFICHE APPENDIX"

Not Applicable

STATEMENT REGARDING FEDERALLY SPONSORED RESEARCH OR DEVELOPMENT

Not Applicable

FIELD OF THE INVENTION

The present invention relates to clip-on type sunglasses, and more particularly, to clip-on type sunglasses having a bridge member that is adapted for mounting the sunglasses on a pair of eyeglasses.

BACKGROUND OF THE INVENTION

In most known clip-on type sunglasses, the eyewires in which the sunglass lenses are mounted, or the sunglass lenses themselves in the case of wireless glasses, are joined at their top edges by a bridge member in the form of a bar or strip of a resilient, flexible material. Typically, the bridge member extends above the lenses and is bowed slightly outwards away from the lenses for biasing the lenses toward one another. To mount clip-on sunglasses of this type on a pair of eyeglasses, the lenses are rotated away from one another, flexing the bridge member. Then, the lenses are positioned juxtaposed with the eyeglass lenses, and then released, whereupon clips that are provided on the outer edges of the sunglass lenses are brought into engagement with the eyeglass frame for securing the sunglasses to the eyeglasses. The sunglasses are held in place on the eyeglasses due to the resilience of the bridge member which urges the clips into engagement with the eyeglass frame.

Conventionally, clip-on type sunglasses include four such clips, two clips located along the outer edge of the left sunglass lens and two clips located along the outer edge of the right sunglass lens. To remove the sunglasses, the wearer merely grasps the sunglass lenses at their top and bottom edges and rotates the lenses outwardly away from each other, which action moves the clips out of engagement with the eyeglass frame.

Although this type of clip-on mount provides for easy mounting and removal of the sunglasses, a downside of this mounting arrangement is that the clips on one or both sides can become disengaged inadvertently, releasing the sunglasses whenever an outwardly directed force is applied to one or both of the sunglass lenses, which can be a common occurrence if the wearer is participating in sports or other activities.

Moreover, this type of clip-on mount requires four clips for securing the sunglasses to the eyeglasses. Many sunglasses have lenses that are made of a light-weight plastic so that the weight of the pair of sunglasses is determined primarily by the frame and the clips. As such, the clips represent a significant portion of the weight of the sunglasses. Because clip-on type sunglasses add weight to the eyeglasses on which they are mounted, it is desirable to minimize the weight of the clip-on type sunglasses.

A further consideration is that most eyeglass wearers select the eyeglass frames that best complement their face. Eyeglasses that are currently very popular have a single bridge frame, with the bridge located at a height that is below the upper edge of the lenses. However, the bridge of most known clip-on sunglasses extends above the lenses. Consequently, when mounted on eyeglasses having a single bridge frame, such clip-on sunglasses give the eyeglasses the appearance of a double bar frame.

For the reasons stated above, and for other reasons stated below which will become apparent to those skilled in the art upon reading and understanding the present specification; there is a need in the art for clip-on type sunglasses which better conform to the shape of the eyeglasses with which they are used and which are characterized by a more secure mounting arrangement that substantially prevents the release of the sunglasses from the eyeglasses on which they are mounted unless such release is intentional. Moreover, there is a need for clip-on type sunglasses that are of a reduced weight.

Another style of eyeglasses have a double bridge (or double bar) frame. In addition to the bridge which is at a height below the upper edge of the lenses there is a second bridge (upper bridge) which generally connects the top portions of the eyeglass lenses. This second bridge protrudes from the top of the frame, making it difficult for a user to obtain clip-on sunglasses for these styles of eyeglasses. Clip-on type sunglasses have not been previously manufactured for double bridge style frames. Thus there is a need in the art for clip-on type sunglasses which can be used on a variety of double bridge eyeglass frames and which can provide a secure mounting arrangement. An embodiment of the present invention is described which has a bridge mounting which fits on the lower bridge of a double bridge eyeglass frame and is mounted independently of the upper bridge.

SUMMARY OF THE INVENTION

The present invention provides a pair of clip-on type sunglasses that are adapted to be mounted on a pair of eyeglasses having first and second eyeglass lenses that are supported by a support means including a bridge element. The sunglasses include first and second lens assemblies that are joined by a bridges member forming a unitary structure. The bridge member is constructed and arranged to extend between two lens assemblies located below a plane that contains the upper edges of the two lens assemblies. The first lens assembly includes a first mounting clip that is located at the lower edge, near the middle thereof, and which extends outwardly from the back of the first lens assembly. The second lens assembly includes a second mounting clip that is located at the lower edge, near the middle thereof, and which extends outwardly from the back of the second lens assembly.

The bridge member of the sunglass frame is adapted to fit behind the bridge portion of the eyeglasses on which the sunglasses are mounted, forming part of the mounting arrangement which also includes the two mounting clips. The use of the bridge member as part of the mounting arrangement eliminates the need for mounting clips on the upper portion of the sunglass frame and allows the sunglasses to better conform to the shape of the eyeglasses on which they are mounted. The improvement of the present invention is that the bridge member contains a central portion which is angled downward from the plane formed by other members of the bridge member. This enables the sunglasses of the present invention to be used on a variety of eyeglass styles. In particular, the present embodiment can be used on eyeglasses having a double bridge frame, a style for which clip-on type sunglasses have not been previously manufactured. When used on double bridge eyeglasses, the present invention is retained on the lower bridge and is independent of the second (upper) bridge of the eyeglasses. The present invention can also be used on a wide variety of eyeglasses having single bridge styles. Moreover, using the bridge member to secure the upper edge of the sunglasses to the eyeglasses and locating the two mounting clips near the middle of the lower edges of the eyewires, results in a more secure mounting than is provided b)y conventional clip-on sunglasses which include four clips on the outer edge of the sunglass lenses which are brought into engagement with the eyeglass frame for securing the sunglasses to the eyeglasses.

BRIEF DESCRIPTION OF THE DRAWINGS

FIG. 7 is a front elevational view of the clip-on type sunglasses provided by the invention shown assembled on a pair of eyeglasses.

FIG. 8 is a rear view of the assembly of FIG. 7.

FIG. 9 is a top view of the assembly of FIG. 7, and illustrating the gap provided between the sunglass frame and the eyeglass frame.

FIG. 10 is a bottom view of the assembly of FIG. 7.

FIG. 12 is a front elevational view of a second embodiment of a pair of clip-on type sunglasses provided by the present invention.

FIG. 13 is a rear view of the sunglasses of FIG. 12.

FIG. 14 is a top view of the sunglasses of FIG. 12.

FIG. 15 is a bottom view of the sunglasses of FIG. 12.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1:
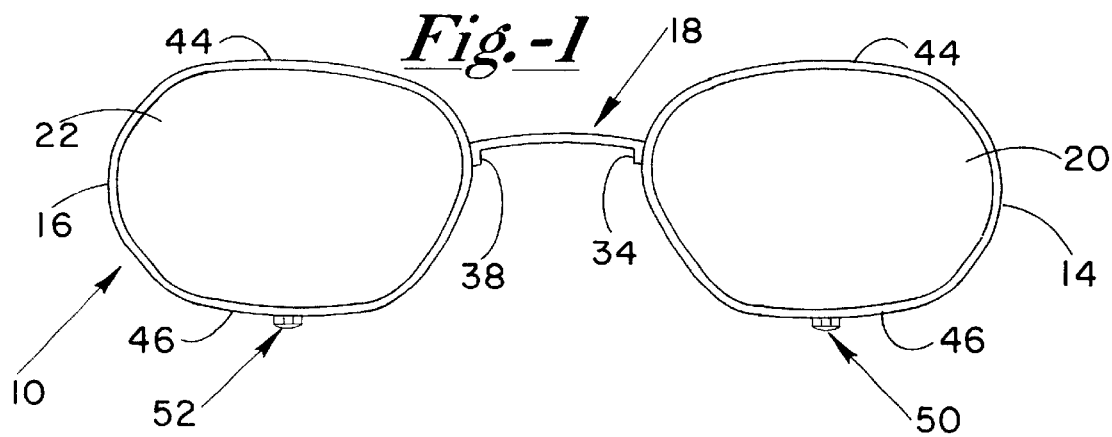
FIG. 1 is a front elevational view of a pair of clip-on type sunglasses provided by the present invention.

Referring to the drawings, FIG. 1 is a front elevational view of a pair of clip-on sunglasses 10 provided by the present invention. The sunglasses include a frame, or front 12 including a left eyewire 14 and a right eyewire 16 joined by a bridge member 18. The terms left and right, as used herein, refer to the orientation of the sunglasses relative to the left and right eyes of a person wearing the sunglasses. The left eyewire 14 contains a left sunglass lens 20 forming a first lens assembly and the right eyewire 16 contains a right sunglass lens 22 forming a second lens assembly. Although in the preferred embodiment, the sunglasses include a frame 12 with a pair of eyewires 41 and 16 for supporting the sunglass lenses 20 and 22, it will be apparent to those skilled in the art that the bridge member 18 can join the sunglass Lenses 20 and 22 directly, in case which no eyewires would be provided. Accordingly, the term lens assembly, as used herein, is intended to refer both to the embodiment illustrated in the drawings wherein the lenses 20 and 22 are mounted in eyewires 14 and 16 which are joined by the bridge member 18, and an embodiment which does not include a frame and the bridge member 18 is connected directly to the lenses 20 and 22.

Figure 2:
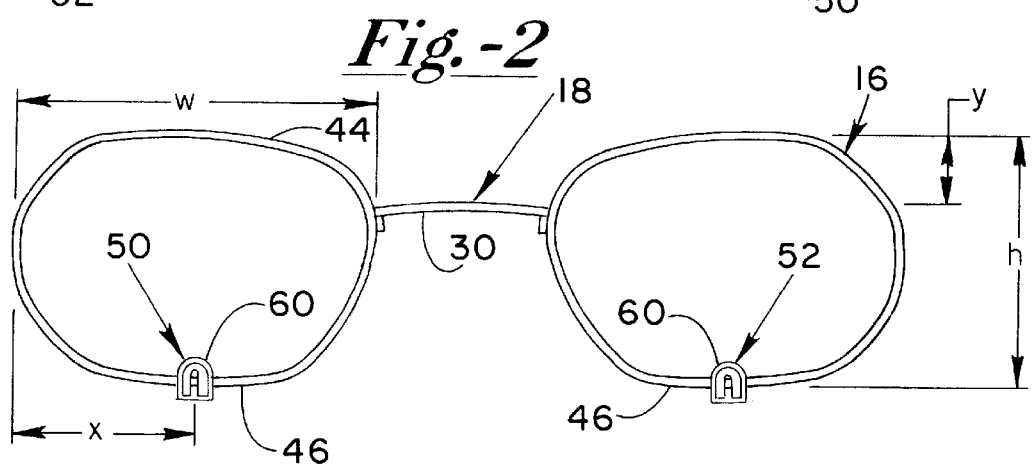
FIG. 2 is a rear view of the sunglasses of FIG. 1.
Figure 3:
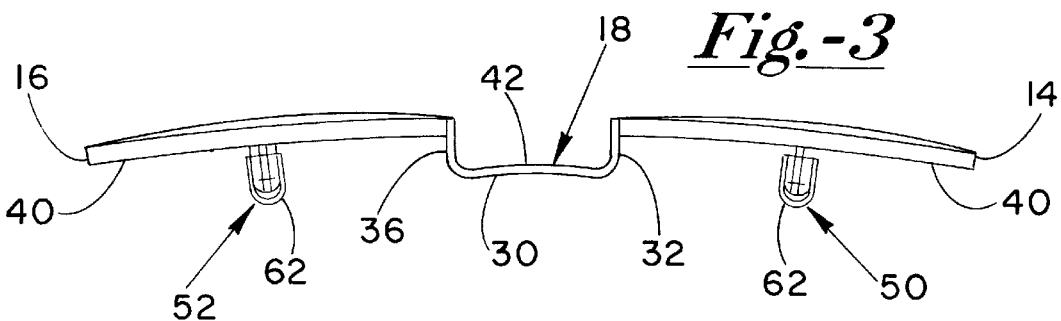
FIG. 3 is a top view of the sunglasses of FIG. 1.
Figure 4:
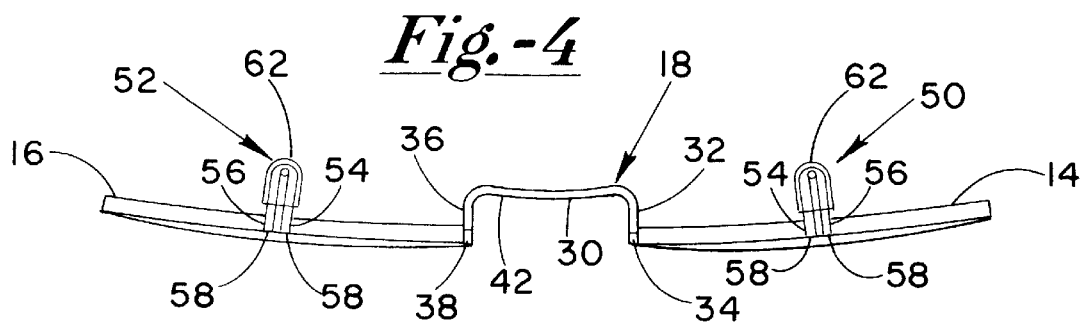
FIG. 4 is a bottom view of the sunglasses of FIG. 1.
Figure 5:
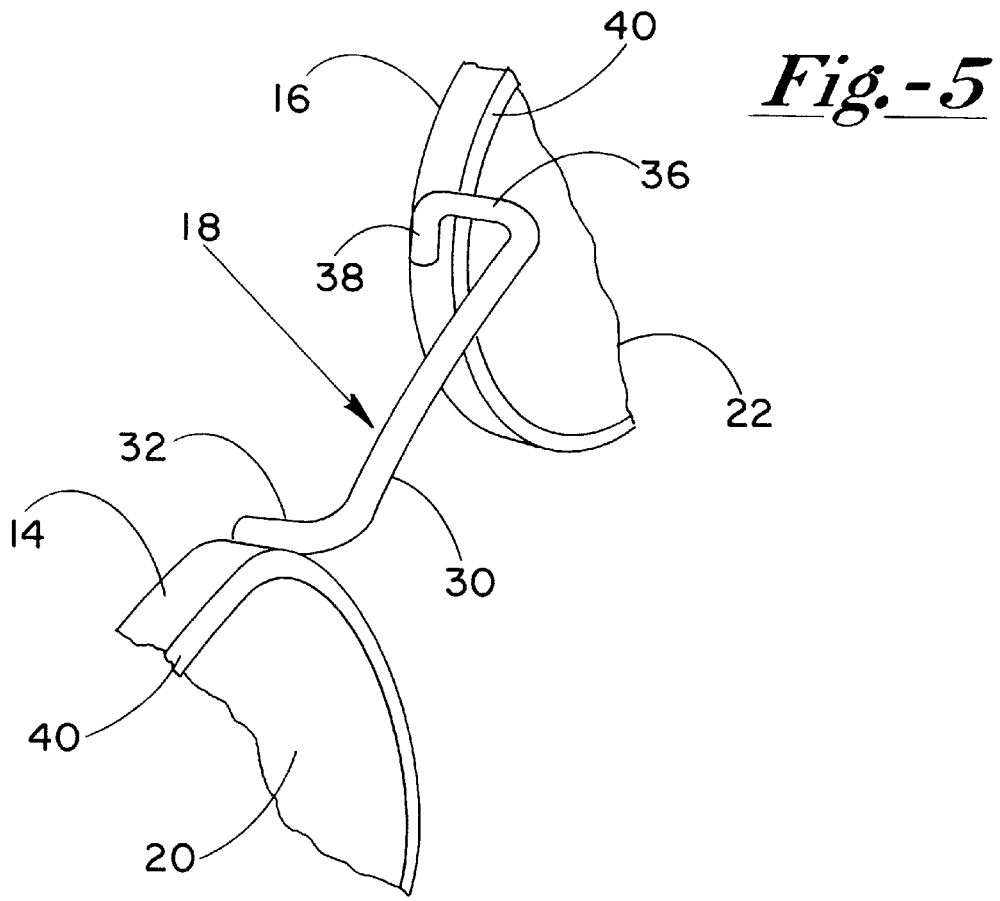
FIG. 5 is an enlarged fragmentary perspective view of a portion of the sunglasses of FIG. 1 and illustrating details of the bridge member.
Figure 6:
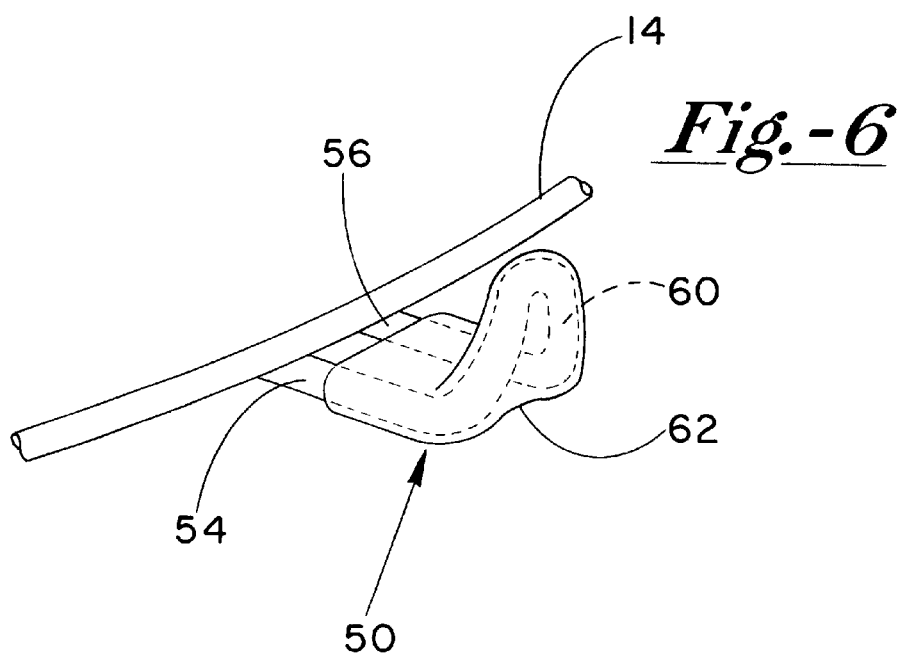
FIG. 6 is an enlarged fragmentary perspective view of a further portion of the sunglasses of FIG. 1 and illustrating details of one of the mounting clips.
Figure 11:
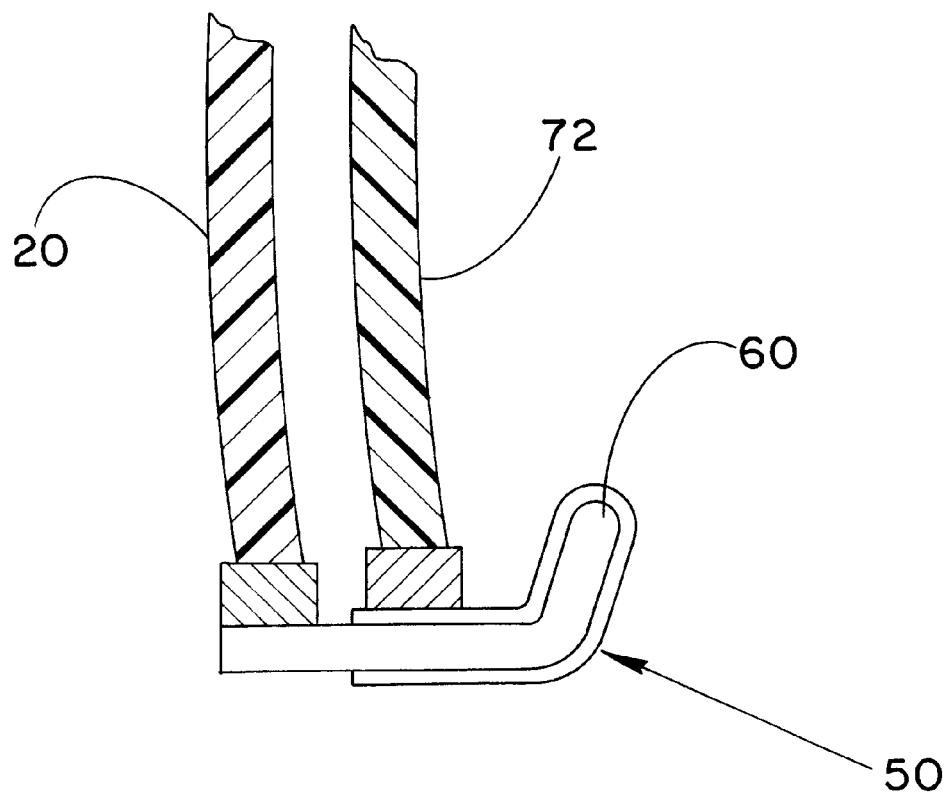
FIG. 11 is an enlarged vertical section view taken along the line 11—11 of FIG. 8.

Referring now to FIGS. 1–5, the bridge member 18 is a thin wire-like element having an elongated main body portion 30, a left arm 32 that terminates in a downwardly extending mounting tab 34 that connects to the left eyewire 14 and a right arm 36 that terminates in a downwardly extending mounting tab 38 that connects to the right eyewire 16. The main body portion 30 of the bridge member is offset rearwardly of the back edges 40 of the eyewires 14 and 16, and thus, rearwardly of the back surfaces of the sunglass lenses. As is illustrated in FIGS. 3 and 4, the main body of the bridge member 18 is bowed forwardly slightly, i.e., in a direction towards the back edges 40 of the eyewires, at its middle as indicated by reference numeral 42. In the embodiment illustrated in the drawings, the main body portion 30 of the bridge member 18 extends generally horizontally, as illustrated in FIGS. 1 and 2. However, the main body portion of the bridge member 18 can be bowed upwardly.

The bridge member 18 is mounted to the eyewires at locations intermediate the upper edges 44 and the lower edges 46 of the eyewires 14 and 16. In the preferred embodiment, the bridge member 18 is connected to the eyewires at about one-third the distance from upper edge 44 to the lower edges 46, and the bridge member 18 lies in a plane extending below a plane containing the upper edges of the eyewires 14 and 16.

Referring to FIGS. 1–4 and 6, a mounting clip 50 is secured to the left eyewire 14 at the lower edge 46 thereof and located near the middle of the lower edge 46; and preferably at the middle of the lower edge 46. A further mounting clip 52 is secured to the right eyewire 16 at the lower edge 46 thereof and located neat the middle of the lower edge 46 and preferably at the middle of the lower edge 46. By way of illustration, the mounting clips 50 and 52 can be formed by bending a short length of wire in half to form parallel horizontally extending segments 54 and 56 which have their free ends 58 secured to the eyewires, with the other end of the wire being bent up forming a U-shaped distal end 60 for the mounting clip. The mounting clips have a protective coating 62, of rubber or silicone, for example, to guard against scratching the frame of the eyeglasses on which the sunglasses are mounted.

The eyewires 14 and 16 of the sunglass frame, and the bridge member 18 are made in the conventional manner. The bridge member 18 is secured to the eyewires 14 and 16 by welding or any other suitable manner, to form the frame 12. Also, the mounting clips 50 and 52 are formed in the conventional manner and secured to the eyewires by welding or another suitable manner. In the preferred embodiment, the frame, the bridge member and the mounting clips are made of a base metal, such as monel metal, stainless steel, titanium, or nickel, and plated with gold, silver, stainless steel, nickel or titanium, for example. Moreover, although preferably the eyewires, the bridge, and the mounting clips are made of metal, the eyewires, the bridge, and the mounting clips can be made of non-metal materials, such as zyl, for example.

Referring to FIG. 2, in one embodiment of the sunglasses that was constructed, the width "w" of the eyewires 14 and 16 was approximately 2 inches. The top to bottom dimension "h" was approximately 1.5 inches. The distance "y" from the top edge 44 to the location of the points at where the bridge member 18 is secured to the eyewires was approximately 0.5 inch. The distance "x" from the outer edge of the eyewires to the points at which the mounting clips 50 and 52 are attached to the eyewires was approximately 1 inch. The length of the main body portion 30 of the bridge member 18 was approximately 1 inch, and the length of the arm portions 32 and 36 was approximately ⅛ inch so that the main body portion of the bridge member was offset rearwardly approximately ⅛ inch relative to the rear edge 40 of the eyewires 14 and 16. The length of the mounting clips 50 and 52 was approximately ⅜ inch, so that the upturned ends 60 thereof were located rearwardly approximately ⅜ inch from the rear edges 40 of the eyewires 14 and 16. These dimensions are given by way of illustration of one particular embodiment and are not intended as a limitation of the scope of the invention as defined by the appended claims. Moreover, although a particular shape and size has been illustrated in the drawings, the sunglasses can be made in different shapes and sizes to more closely conform to the shape and size of the eyeglasses with which they are used.

Referring to FIGS. 7–11, the sunglasses 10 are shown mounted on a pair of conventional eyeglasses 70. The eyeglasses 70 include left and right eyeglass lenses 72 and 74 that are supported in a side-by-side relationship in a frame or support means 75 including eyewires 76 and 78 which are joined by a bridge 80. The frame 75 has hinge mounts 82 for mounting temples (not shown). Although the eyeglasses 70 include a frame 75, this is merely by way of illustration of the application of the sunglasses provided by the invention, and it will be apparent that the sunglasses 10 can be mounted on frameless eyeglasses.

As is shown in FIGS. 7 and 8, when the sunglasses 10 are mounted on the eyeglasses 70, the bridge member 18 is juxtaposed with the bridge member 80 of the eyeglasses rather than extending above the eyeglasses, as is the case for conventional clip-on sunglasses and which creates a double bridge look for combined glasses and sunglasses. Moreover, there are no mounting clips on the upper edge of the glasses. The bridge member 18 and the two mounting clips 50 and 52, that are located at the bottom of the lower edge near the middle thereof, secure the sunglasses to the eyeglasses. The mounting clips 50 and 52 can be adjusted using a needle nose pliers to be bent inward or outward to decrease or increase the space 84 (FIG. 11) between the ends 60 of the mounting clips and the eyeglass frame.

As is shown in FIGS. 9 and 10, the bridge member 18 of the sunglasses 10 fits behind the bridge 80 of the eyeglasses 70. The mounting clips 50 and 52 receive the bottom edges 83 of the left and right eyewires 76 and 78, respectively. The rearward displacement of the bridge member 18 and the rearward extension of the mounting clips 50 and 52 enable the sunglass frame 12 to be spaced from the eyeglass frame 75 forming a gap 86 therebetween as shown in FIGS. 9 and 10, for example. This enables the sunglasses 10 to be used with eyeglasses that have ultra thin lenses, eyeglasses that have relatively thick lenses, as well as eyeglasses having lenses which range in size from ultra thin lenses to relatively thick.

Referring to FIGS. 7–11, to mount the sunglasses 10 on the eyeglasses 70, the sunglasses, either while being worn or while being held in the hands of the wearer, are aligned with the eyeglasses with the left lens assembly overlying the left eyeglass lens 72 and the right lens assembly overlying the right eyeglass lens 74 and with one of the mounting clips, mounting clip 50 in this case, positioned on the lower edge of the eyewire 76, "hooking" the left side of the sunglasses to the eyeglasses. Then, the right lens assembly is rotated slightly in the direction away from the left lens assembly to flex the bridge member 18 allowing the other mounting clip 52 to clear the side of the eyewire 78 and raising the bridge member 18 slightly above the bridge element 80 of the eyeglasses. Then, bridge member 18 is moved rearwardly over and behind the bridge element 80 and the right lens assembly is released, allowing the bridge member 18 to restore, moving the mounting clip 52 into underlying relation with the right eyeglass eyewire 78. To remove the sunglasses 10 from the eyeglasses, a similar, but opposite procedure is used. First one of the lens assemblies, such as the right lens assembly is rotated away from the other lens assembly flexing the bridge member 18. As the bridge member is flexed, the mounting clip 50 or 52 is moved out of engagement with the eyeglass frame, and the sunglasses 10 can be removed.

Alternatively, the sunglasses 10 can be mounted on the eyeglasses by first engaging both of the mounting clips 50 and 52 on the bottom edge of the eyeglass frame and then pivoting the sunglasses upwardly until the bridge member 18 is located adjacent to the bridge element 80 of the eyeglass frame. The bridge member 18 then can be worked up and over the bridge by manipulating with the thumb and forefinger, effectively sliding the bridge member 18 over the bridge element 80 to the position illustrated in FIGS. 9 and 10, for example, where the bridge member 18 is located behind the bridge element 80. The reverse procedure is used to remove the sunglasses Referring to FIGS. 12–17. FIG. 12 is a front elevational view of a pair of clip-on sunglasses 100 provided by the present invention. The sunglasses include a frame 112 including a left eyewire 114 and a right eyewire 116 joined by a bridge member 118. The terms left and right, as used herein, refer to the orientation of the sunglasses relative to the left and right eyes of a person wearing the sunglasses. The left eyewire 114 is attached to a left sunglass lens 120 forming a first lens assembly and the right eyewire 116 is attached to a right sunglass lens 122 forming a second lens assembly. In the preferred embodiment, the sunglasses 100 include a frame 112 with a pair of eyewires 114 and 116 for supporting the sunglass lenses 120 and 122, but it will be apparent to those skilled in the art that the bridge member 118 can join the sunglass lenses 120 and 122 directly, in which case no eye(wires would be provided. Accordingly, the term lens assembly, as used herein, is intended to refer both to the embodiment illustrated in the drawings wherein the lenses 120 and 122 are mounted in eyewires 114 and 116 which are joined by the bridge member 118, and an embodiment which dies not include a frame (frameless or rimless eyeglasses) and the bridge member 118 is connected directly to the lenses 120 and 122.

In this embodiment, the left 114 and right 116 eyewires partially enclose left 120 end right 122 sunglass lenses, giving the appearance of a partial frame. The respective left 120 and right 122 sunglass lenses are attached to their respective left 114 and right 116 eyewires by a tensed wire 123 of nylon or the like, which completes the enclosure of the lenses. The tensed wire is not readily visible to a casual observer. The ends of this tensed wire 123 are received in respective end openings 114a, 114b, 116a, and 116b along the respective eyewires, preferably at the ends 114c, 114d, 116c, and 116d thereof. The wires 123 are then affixed at these respective openings 114a, 114b, 116a, and 116b by conventional methods known to those skilled in the art, securing the left 120 and right 122 sunglasses to the left 114 and right 116 eyewires, respectively.

All components (elements) of the sunglasses 100 of this second embodiment are of identical and/or similar construction and materials to those shown and described for the sunglasses 10 of FIGS. 1–11, above, except as indicated below. Similarly, the dimension references "h", "w", "x", and "y" in FIG. 2 above are also applicable for the respective dimensions "h", "w", "x", and "y" shown in FIG. 13.

Figure 16:
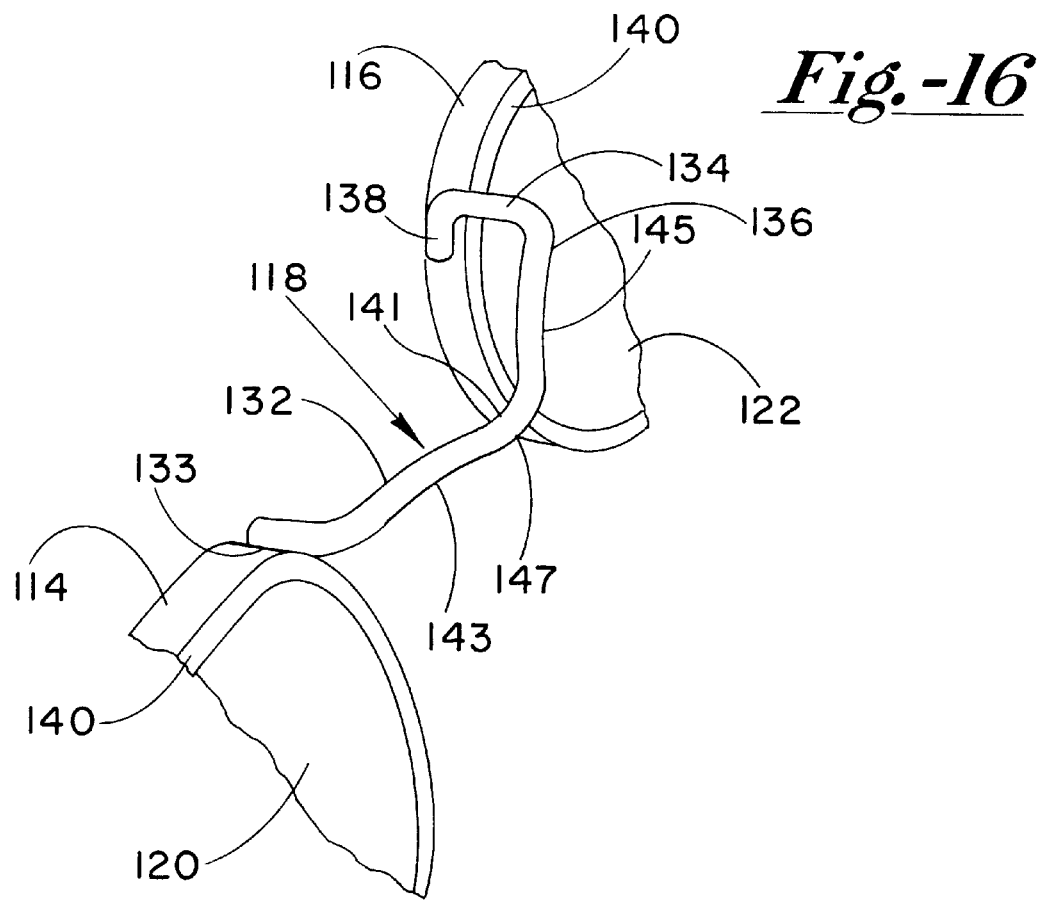
FIG. 16 is an enlarged fragmentary perspective view of a portion of the sunglasses of FIG. 12 and illustrating details of the bridge member.

The sunglasses 100 of this second embodiment differ from the sunglasses 10 of FIGS. 1–11 above, in that the bridge member, shown in detail in FIG. 16, has a different configuration (overall shape) than bridge member 18 (above). The mounting clips 150 and 152 are slightly different in shape from those shown in FIGS. 1–11 above, although the mounting clips 50 and 52 are also suitable for use on sunglasses 100. Additionally, the positioning of the mounting clips 150 and 152 may differ slightly as a result of the shape of the frame.

Referring now to FIGS. 12–17, the bridge member 118 is a thin wire-like element having an elongated main body portion 130. Main body portion 130 further has an angled central body portion or dip 141 that comprises lower arms 143 and 145, which are joined together to form angled member or vertex 147. Left middle arm 132, and a left upper arm 133 that terminates in a downwardly extending mounting tab 134 that connects to the left eyewire 114 connect to one side of angled member or vertex 147. A right middle arm 136 is attached to the other side of angled member or vertex 147. Right middle arm 136 and right upper arm 137 terminate in a downwardly extending mounting tab 138 that connects to the right eyewire 116.

The main body portion 130 of bridge member 118 is offset rearwardly of the back edges 140 of the eyewires 114 and 116, and thus, rearwardly of the back surfaces of the sunglass lenses. Angled central body portion or dip 141 is preferably V-shaped, and extends downward, toward the lower edges 146 (below) of the eyewires 114 and 116 of the respective sunglass lens assemblies. Angled central body portion or dip 141 terminates in an angled member or vertex 147. This angled central body portion 141, along with its angled member or vertex 147, is preferably centrally located along the main body portion 130. The angled central body portion or dip 141 could also be rectangular, rounded or combinations thereof in its shape.

As shown in the top perspective view in FIG. 16, the main body portion 130 of bridge member 118 is bowed forwardly slightly, i.e., in a direction towards the back edges 140 of the eyewires, at its middle as indicated by angled member 147. In addition to being bowed slightly forward, angled member 147 is angled downward, i.e., beneath the plane defined by the middle arms 132 and 136, which as shown in the embodiment illustrated in the drawings, extend generally horizontally. This downwardly extending angled central body portion or dip 141 allows bridge member 118 to at least partially surround (wrap around) the bridge element of the eyeglasses when the sunglasses 100 are being retained on the eyeglasses of the wearer (shown in FIGS. 18–21).

The bridge member 118 is mounted to the eyewires at locations intermediate the upper edges 144 and the lower edges 146 of the eyewires 114 and 116. In this embodiment, bridge member 118 is connected to the eyewires at about three-eighths of an inch from the end of upper edge 144, (approximately one-third the distance from the upper edges 144 to the lower edges 146) and the bridge member 118 lies in a plane extending below a plane defined by the upper edges 144 of the eyewires 114 and 116.

The middle arms 132 and 136 are inclined upward or parallel with respect to the horizontal, and the upper arms 133 and 137 extend rearward (in a direction away from the frame 112, from their respective mounting tabs 134 and 138 to main body portion 130. This inclination and rearward extension of the arms 132, 133, 136, and 137, coupled with main body portion 130 accommodates the dimensions of the particular bridge of the eyeglasses to which the sunglasses will be mounted. Compared to the embodiment described in FIGS. 1–5, bridge member 118 is angled further away from the plane of the front of the sunglasses. This increased angle and subsequent gap functions to allow this embodiment of the clip-on sunglasses to be used on a wider variety of single bar eyeglass frames than the embodiment shown in FIGS. 1–5.

Preferably, arms 132 and 136 terminate at main body portion 130 at a point that corresponds to a location either at or beyond, most preferably just beyond, the rear side of the bridge element of the eyeglasses. However, only a portion of the angled central body portion or dip 141, including the angled member or vertex 147, needs to correspond to a position at or beyond the rear side of the bridge element of the eyeglasses. This arrangement of the main body portion 130, angled central body portion or dip 141 and the arms 132, 133, 136, and 137 allows engagement of the bridge element of the eyeglasses by bridge member 118 in a partially surrounding or partially wrapping manner, with respect to the bridge element of the eyeglasses along its top and rear sides, and abutting the bridge element along either or both of the top and rear sides. This is shown, for example, in FIGS. 18–21, detailed below.

Figure 17:
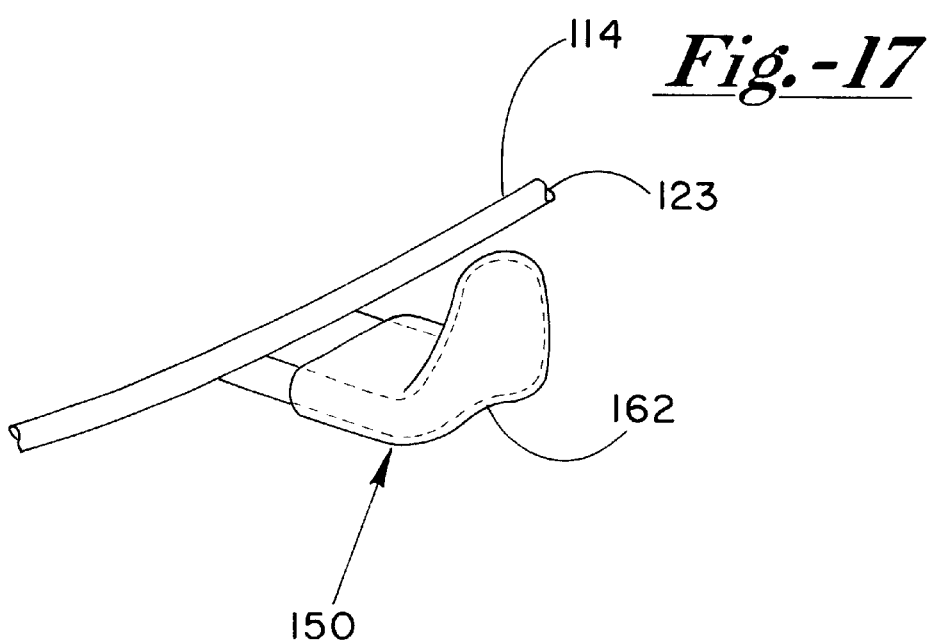
FIG. 17 is an enlarged fragmentary perspective view of a further portion of the sunglasses of FIG. 12 and illustrating details of one of the mounting clips.

Referring to FIG. 17, a mounting clip 150 is secured to the left eyewire 114 at the lower edge 146 thereof and located near the end 114d of left eyewire 114. Although in the preferred embodiment shown in FIG. 12, the clip is attached proximate an end of the eyewire 112, the mounting clip is preferentially attached to the sunglasses such that the position of the mounting clip is the approximate middle of the lower portion of the sunglass lens. A second mounting clip 152 is similarly secured to the right eyewire 116 in a similar position and fashion. The mounting clips comprise a short strip of wire having an end 151 or 153 secured to the eyewires, and the other end 160 of the wire is bent upward so as to be able to engage the eyeglass lens assembly. As shown in the embodiment illustrated in FIG. 14 this can be a solid strip of metal, but this is for illustration only. The mounting clips have a protective coating 162, of rubber or silicone, for example, to guard against scratching the frame of the eyeglasses on which the sunglasses are mounted.

The eyewires 114 and 116 of the sunglass frame, and the bridge member 118 are made in the conventional manner. The bridge member 118 is secured to the eyewires 114 and 116 by welding or any other suitable manner, to form the frame 112. The mounting clips 150 and 152 are formed in the conventional manner and secured to the eyewires by welding or another suitable manner known to those skilled in the art. In this preferred embodiment, the frame, the bridge member and the mounting clips are made of a base metal, such as monel metal, stainless steel, titanium, or nickel, and plated with gold, silver, stainless steel, nickel, or titanium, for example. Although preferably the eyewires, the bridge, and the mounting clips are made of metal, the eyewires, the bridge, and the mounting clips can be made of non-metal materials, such as zyl, for example, FIG. 13 refers to au embodiment of the sunglasses that was constructed, the width "w" of the eyewires 114 and 116 was approximately 2 inches. The top to bottom dimension "h" was approximately 1.5 inches. The distance "y" from the upper edge 144 to the location of the points at where the bridge member 118 is secured to the eyewires was approximately one-half inch. The distance "x" from the outer edge of the eyewires to the points at which the mounting clips 150 and 152 are attached to the eyewires was approximately one inch. The length of the main body portion 130 of the bridge member 118 was approximately one inch, and the length of the arm portions 132 and 136 was approximately one-eighth inch so that the main body portion of the bridge member was offset rearwardly approximately one-eighth inch relative to the rear edge 140 of the eyewires 116 and 118. The length of the mounting clips 150 and 152 was approximately three-eighths inch, so that the upturned ends 162 thereof were located rearwardly approximately three-eighths inch from the rear edges 140 of the eyewires 114 and 116. These dimensions are given by way of illustration of one particular embodiment and are not intended as a limitation of the scope of the invention as defined by the appended claims. Moreover, although a particular shape and size has been illustrated in the drawings, the sunglasses can be made in different shapes and sizes to more closely conform to the shape and size of the eyeglasses with which they are used.

Referring to FIGS. 18–21, the sunglasses 100 are shown mounted on a pair of conventional eyeglasses 70. The eyeglasses 70 include left and right eyeglass lenses 72 and 74 that are supported in a side-by-side relationship in a frame or support means 75 including eyewires 76 and 78 which are joined by a bridge 80. The frame 75 has hinge mounts 82 for mounting temples (not shown). Although the eyeglasses 70 include a frame 75, this is merely by way of illustration of the application of the sunglasses provided by the invention, and it will be apparent that the sunglasses 100 can be mounted on frameless eyeglasses.

Figure 18:
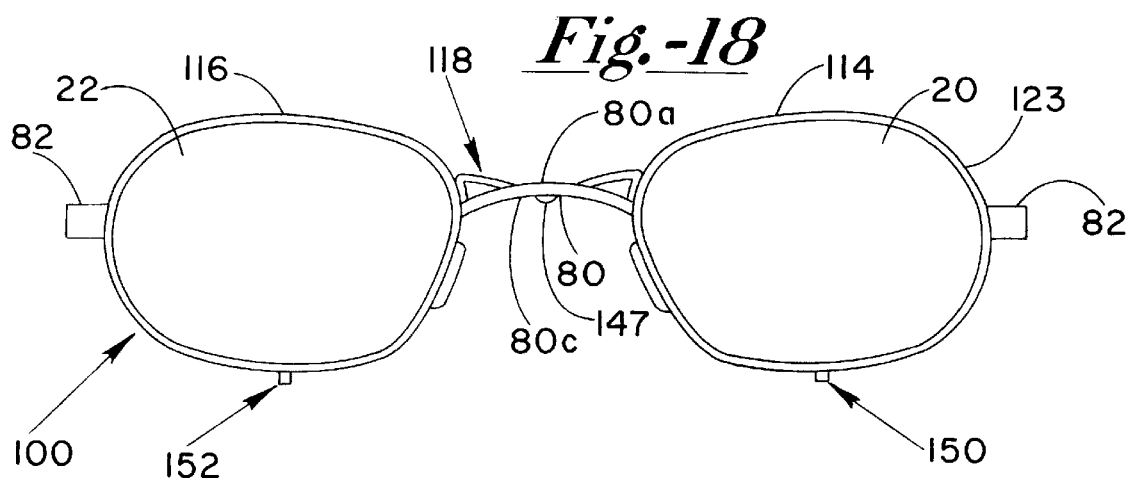
FIG. 18 is a front elevational view of the clip-on type sunglasses provided by the second embodiment of the invention shown assembled on a pair of eyeglasses.
Figure 19:
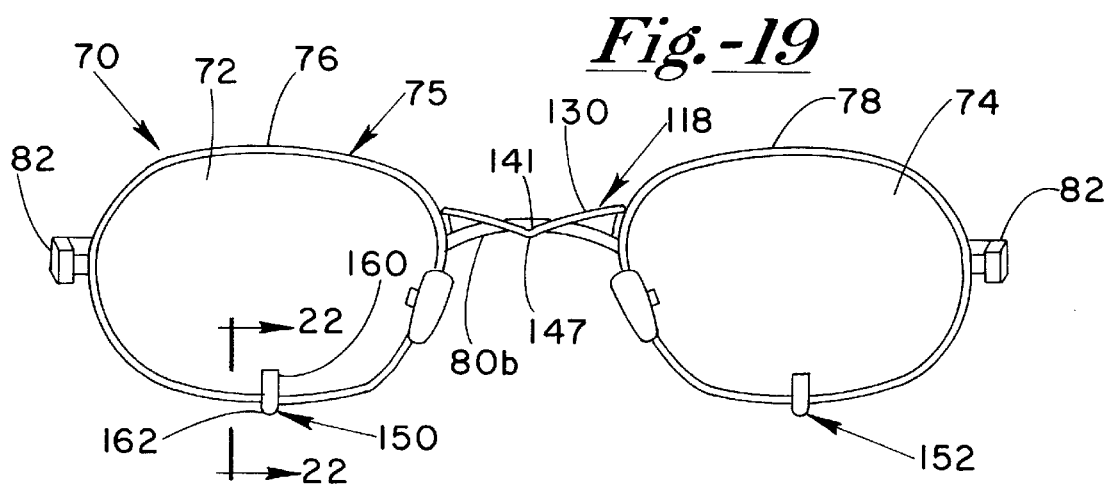
FIG. 19 is a rear view of the assembly of FIG. 18.

As is shown in FIGS. 18 and 19, when the sunglasses 100 are mounted on the eyeglasses 70, the bridge member 118 is juxtaposed with the bridge member 80 of the eyeglasses similar to that shown in FIGS. 7 and 8 above.

Figure 22:
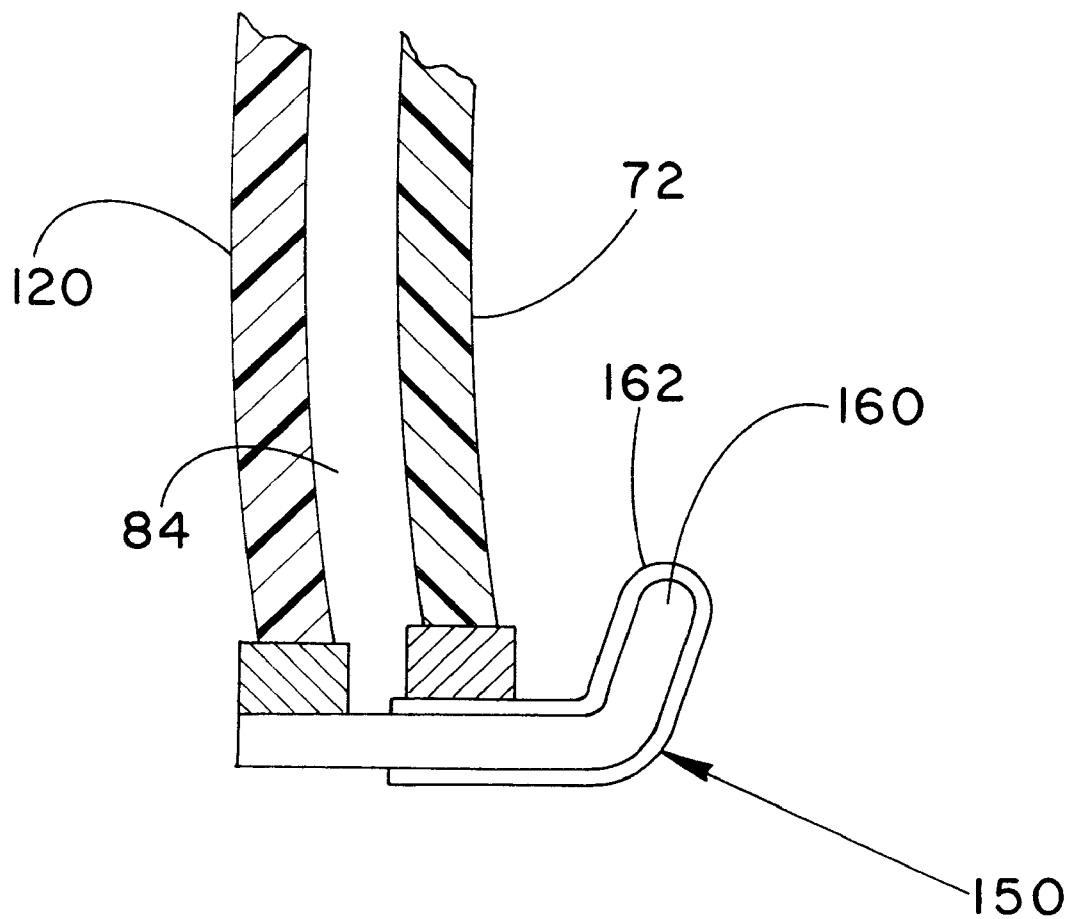
FIG. 22 is an enlarged vertical section view taken along the line 22—22 of FIG. 19.

The bridge member 118 with the dip (angled member) 141 and the two mounting clips 150 and 152, that are located at the bottom of the lower edge near the middle thereof, secure the sunglasses to the eyeglasses. Similar to that described above, the mounting clips 150 and 152 can be adjusted using a needle nose pliers to be bent inward or outward to decrease or increase the space 84 (FIG. 22) between the ends 160 of the mounting clips 150 and 152 and the eyeglass frame.

Figure 20:
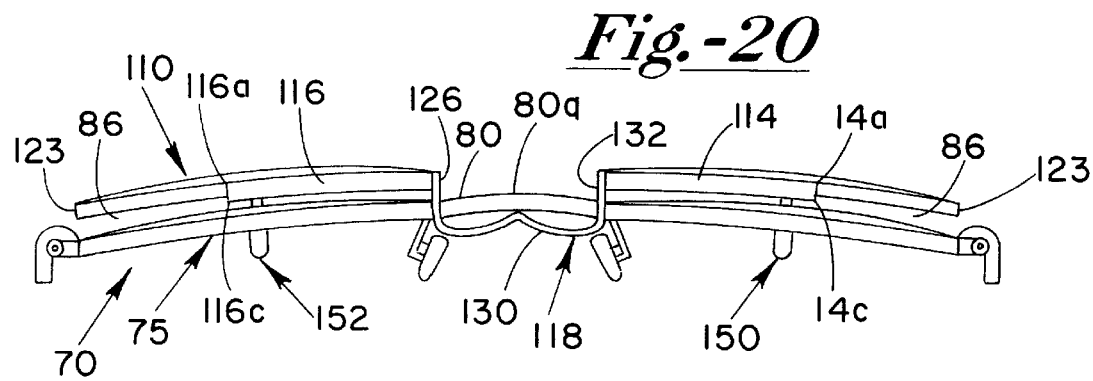
FIG. 20 is a top view of the assembly of FIG. 18, and illustrating the gap provided between the sunglass frame and the eyeglass frame.
Figure 21:
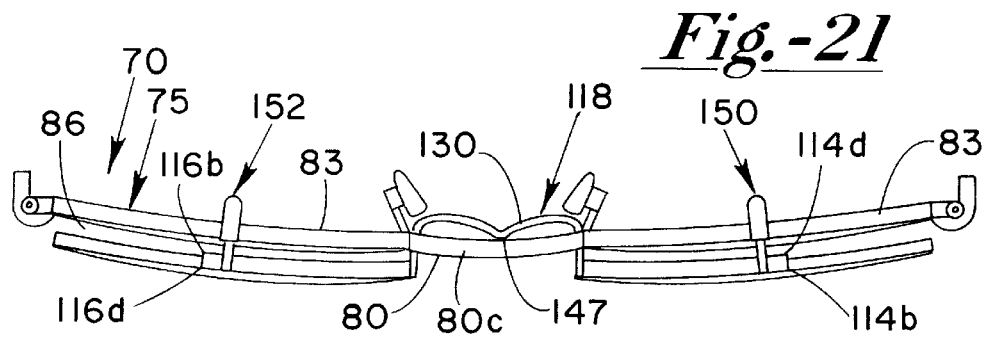
FIG. 21 is a bottom view of the assembly of FIG. 18.

As is shown in FIGS. 20 and 21, the bridge member 118 of the sunglasses 100 preferably extends to fit above and behind the bridge 80 of the eyeglasses 70.

The arms 132, 133, 136, and 137 extend over the top side 80a of the bridge element 80, and may be in abutment therewith. The angled body portion (dip) 141 is positioned at a point corresponding to a point behind (beyond) the bridge element 80 fin particular the rear side 80b of bridge element 80) of the eyeglasses 70. Portions of the main body portion 130, that may include the angled body portion (or dip) 141 and/or the angled member or vertex 147, abut at least a part of the bridge element 80 of the eyeglasses 70, thereby enhancing the retention of the sunglasses 100 on the eyeglasses 70. It is preferred that the angled body portion or dip 141 extend slightly downward (toward the lower edges of the eyewires 114 and 116), preferably with the angled member or vertex 147 not extending beyond the lower side 80c of bridge element 80. However, for certain styles of eyeglasses, this will not be possible due to the shape and/or position of the bridge with respect to the lens assemblies, and in these cases it is acceptable for the angled body portion or dip 141 and/or its angled member or vertex 147 to extend downward, beyond the bridge element (the lower side of the bridge) of the eyeglasses. The mounting clips 150 and 152 receive the bottom edges 83 of the left and right eyewires 76 and 78, respectively. Similar to that discussed above for the embodiment shown in FIGS. 1–11, the rearward displacement of the bridge member 118 and the rearward extension of the mounting clips 150 and 152 enable the sunglass frame 112 to be spaced from the eyeglass frame 75 forming a gap 86 therebetween as shown in FIGS. 20 and 21, for example. This enables the sunglasses 100 to be used with eyeglasses that have ultra thin lenses, eyeglasses that have relatively thick lenses, as well as eyeglasses having lenses which range in size from ultra thin lenses to relatively thick. The combination of the angled member 141 of the bridge member 118 and the orientation of the bridge member 118 with respect to the bridge element of the eyeglasses enables the sunglasses 100 of the present invention to be used with a wider variety of single bar eyeglass frames than the sunglasses described in our copending U.S. patent application.

Referring to FIGS. 18–22, to mount the sunglasses 100 on the eyeglasses 70, the sunglasses 100, either while being worn or while being in the hands of the wearer, are aligned with the eyeglasses 70, with the left lens assembly overlying the left eyeglass lens 72, the right lens assembly overlying the right eyeglass tens 74, and with one of the mounting clips, mounting clip 150 in this case, positioned on the lower edge of the eyewire 76 "hooking" the left side of the sunglasses 100 to the eyeglasses 70. The sunglasses 100 are rotated upward slightly, such that the main body portion 130 of bridge member 118 clears the bridge element 80 of the eyeglasses. The sunglasses 100 are then rotated downward, to a position where bridge member 108 engages the bridge element 80 of the eyeglasses, with the angled body portion or dip 141 of the main body portion 130 resting behind bridge element 80, in particular, behind rear side 80b of the bridge element of the eyeglasses 70. The right lens assembly is rotated downward with the right mounting clip 152 moving to a point beyond the right eyewire 78. The right lens assembly is released and is allowed to spring toward the eyewire 78, such that mounting clip 152 moves into an underlying relation with the right eyewire 78, "hooking" the right lens assembly of the eyeglasses. The resilient and springlike behavior is a property of the material (discussed above) used to manufacture the sunglasses 100. This mounting procedure could also be performed oppositely, provided mounting clip 152 was initially positioned on the lower edge of the right eyewire 78 "hooking" the right side of the sunglasses 100 to the eyeglasses. All subsequent mounting steps would be the same but opposite those described immediately above.

To remove the sunglasses 100 from the eyeglasses 70, a similar but opposite procedure is used. First, one of the lens assemblies of the sunglasses 100, such as the right lens assembly, is rotated downward, flexing the bridge member 118. As the bridge member 118 is flexed, the right lens assembly of the sunglasses 100 is moved forward (in a direction away from the eyeglasses 70), such that mounting clip 152 is out of engagement (unhooked) with the eyeglass frame 75. The other lens assembly of the sunglasses 100, (the left lens assembly), is then unhooked in a manner similar to that done for the right lens assembly of the sunglasses 100. The sunglasses 100 can then be moved slightly upward, allowing bridge member 118 to be disengaged from the bridge element 80 of the eyeglasses 70, whereby the sunglasses 100 are removed and separated from the eyeglasses 70.

Alternately, the sunglasses 100 can be mounted to the eyeglasses 70 by initially aligning the sunglasses 100 with the eyeglasses 70 so that the lens assemblies correspond, as detailed above, and engaging the bridge member 118 with main body portion 130 and angled body portion or dip 141 behind bridge element 80, such that a portion of main body 130 preferably abuts the bridge element 80, along the rear side 80b thereof, of eyeglasses 70. The respective left and right lens assemblies of the sunglasses are then rotated downward, either simultaneously, or one at a time, such that the respective mounting clips 150, 152 extend below the respective eyewires 76, 78 of eyeglasses 70. The left and right lens assemblies of the sunglasses 100, preferably at the respective eyewires 114, 116, are pressed toward the eyeglasses 70, with slight or gentle pressure, as the bridge member 118 flexes. The pressure on each lens assembly 114, 116 is released, either simultaneously, or one lens assembly at a time, and by spring-like action, each lens assembly 114, 116 is released. Once released, each mounting clip 150, 152 moves into an underlying relation with respect to the respective eyewires 76, 78 of eyeglasses 70, "hooking" the respective lens assembly of the eyeglasses 70. Removal of the sunglasses 100 from the eyeglasses 70 (and ultimately separation thereof) is in accordance with the procedure detailed above.

In a third mounting procedure, the sunglasses 100 are aligned with the eyeglasses 70 so that the lens assemblies correspond, as detailed above. The mounting clips 150, 152 of the sunglasses 100 are placed into an underlying relation with respect to the respective eyewires 76, 78 of the eyeglasses 70. The eyewires 114, 116 of the sunglasses 100 are then pushed upward, by applying gentle pressure, preferably at the lower portions of the eyewires 114, 116, until bridge member 118 flexes and main body portion 130, including the angled body portion or dip 141 and arms 132, 133, 136, and 137 clear (are above) bridge element 80 of the eyeglasses 70. The bridge member 118 remains flexed, as the frame 112 of the eyeglasses is pushed rearward, in the direction of the frame 75 of the eyeglasses, such that main body portion 130 is beyond (rearward of) the rear side 80b of the bridge element 80 of the eyeglasses 70. The pressure is then released, such that main body member 130 engages the bridge element, with the angled body portion or dip 141 resting at a point rearward (beyond) the rear side 80b of the bridge element 80 of the eyeglasses, as described above. Removal of the sunglasses 100 from the eyeglasses 70 (and ultimately separation thereof) is in accordance with the procedure detailed above.

Figure 28:
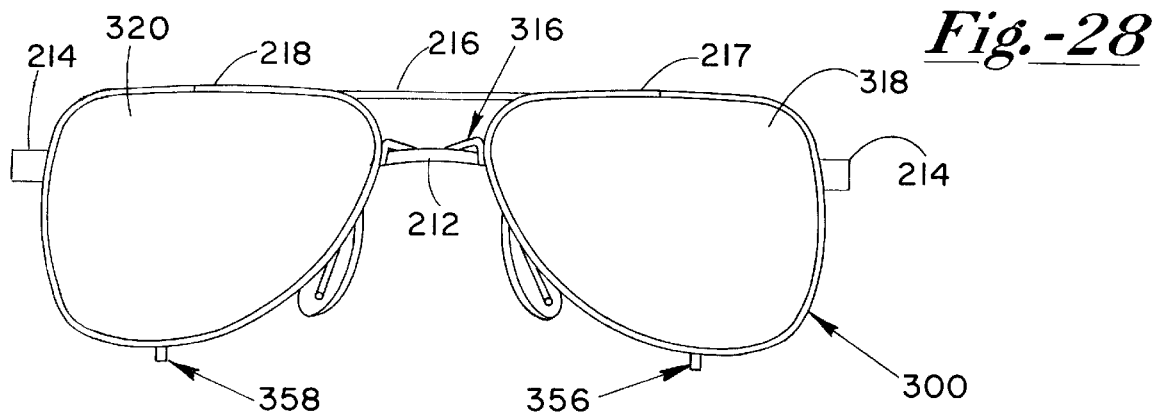
FIG. 28 is a front elevational view of the clip-on type sunglasses provided by the third embodiment of the invention shown assembled on a pair of double bridge eyeglasses.
Figure 29:
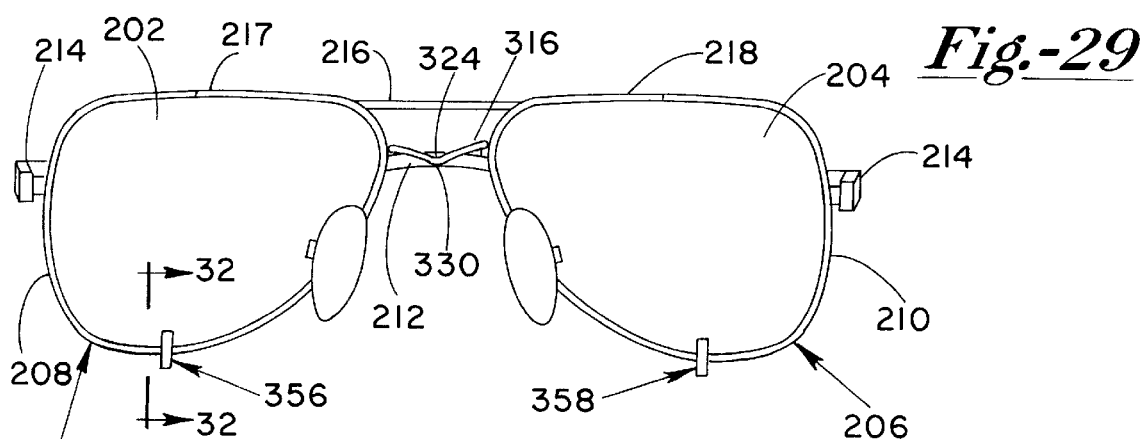
FIG. 29 is a rear view of the assembly of FIG. 28.

Eyeglass frames that have a double bridge (also called a double bar) such as those shown in FIG. 28, have posed mechanical difficulty in mounting clip-on type sunglasses. A third embodiment of the present invention, to be described below, successfully fits double bridge sunglasses, and enables the user to mount these sunglasses on their double bridge eyeglasses without interference from the eyeglass' upper bridge element.

These eyeglasses are similar to the eyeglasses 70 described and shown above (FIGS. 7–11 and 18–22), but differ in the shapes and dimensions of the components, and more particularly, to the presence of a second or upper bridge element connecting the upper edges of the lens assemblies.

Double bridge eyeglasses 200 (FIG. 28) include left and right eyeglass lenses 202 and 204 that are supported in a side-by-side relationship in a frame or support means 206 including eyewires 208 and 210 which are joined by a first or lower bridge element 212. The frame has hinge means 214 for mounting temples (not shown). A second or upper bridge element 216 is attached between the upper portions 217 and 218 of the left and right eyewires, 208 and 210, respectively. The terms left and right refer to the orientation of the eyeglasses or sunglasses relative to the left and right eyes of a person wearing the eyeglasses or sunglasses. Although the eyeglasses 200 include a frame 206, this is merely by way of illustration of the application of the sunglasses provided by the invention, and it will be apparent that the sunglasses 300 can be mounted on frameless eyeglasses. Second bridge element 216 extends forwardly from the plane of the eyewires when viewed from the top (FIG. 25) in some embodiments of this style of eyeglasses.

Figure 23:
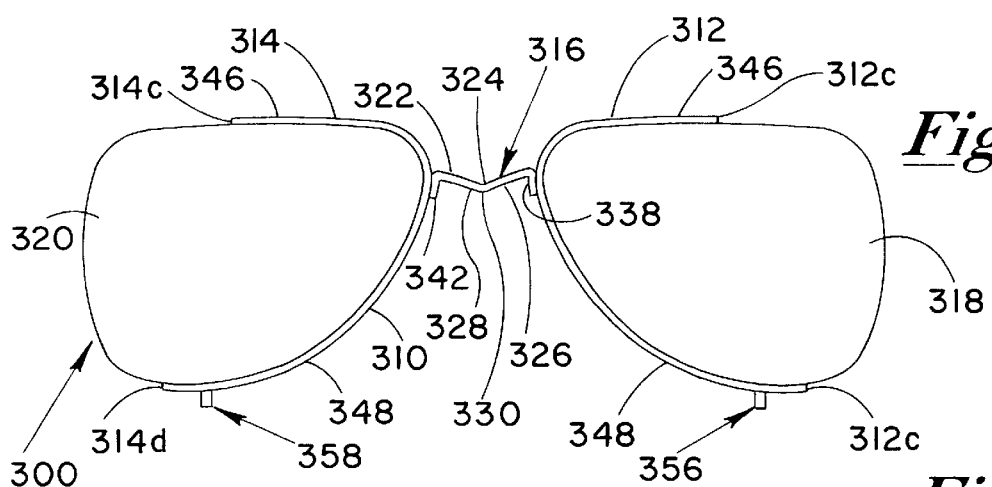
FIG. 23 is a front elevational view of a pair of clip-on type sunglasses provided by a third embodiment of the present invention.

An embodiment of the present invention designed to fit double bridge eyeglasses is shown in a perspective view in FIG. 23. The improved sunglasses 300 include a frame 310 including a left eyewire 312 and a right eyewire 314 joined by a bridge member 316. The left eyewire 312 is attached to a left sunglass lens 318 forming a first lens assembly and the right eyewire 314 is attached to a right sunglass lens 320 forming a second lens assembly. In this embodiment, the sunglasses 300 include a frame 310 with a pair of eyewires 312 and 314 for supporting the sunglass lenses 318 and 320, but the frame 310 does not completely enclose the sunglass lenses. It will be apparent to those skilled in the art that the bridge member 316 can join the sunglass lenses 318 and 320 directly, in which case no eyewires would be provided, or join sunglass lenses wherein the eyewires completely enclose the sunglass lenses to form a complete frame. Accordingly, the term lens assembly, is intended to refer both to the embodiment illustrated in the drawings wherein the lenses 318 and 320 are mounted in eyewires 312 and 314 which are joined by bridge member 316, an embodiment which does not include a frame and the bridge member 316 is connected directly to the lenses 318 and 320 or an embodiment wherein the lenses 318 and 320 are completely mounted in eyewires to form a complete frame.

Referring now to FIGS. 23–27, the bridge member 316 is a thin wire-like element having an elongated main body portion 322. Main body portion 322 further has an angled central body portion or dip 324 that comprises lower arms 326 and 328, joined together to form angled member or vertex 330. Left middle arm 332, and a left upper arm 334 that terminates in a downwardly extending mounting tab 336 that connects to the left eyewire 312 connect to one side of angled member or vertex 330. A right middle arm 338 is attached to the other side of angled member or vertex 330. Right middle arm 338 and right upper arm 340 terminate in a downwardly extending mounting tab 342 that connects to the right eyewire 314.

Figure 27:
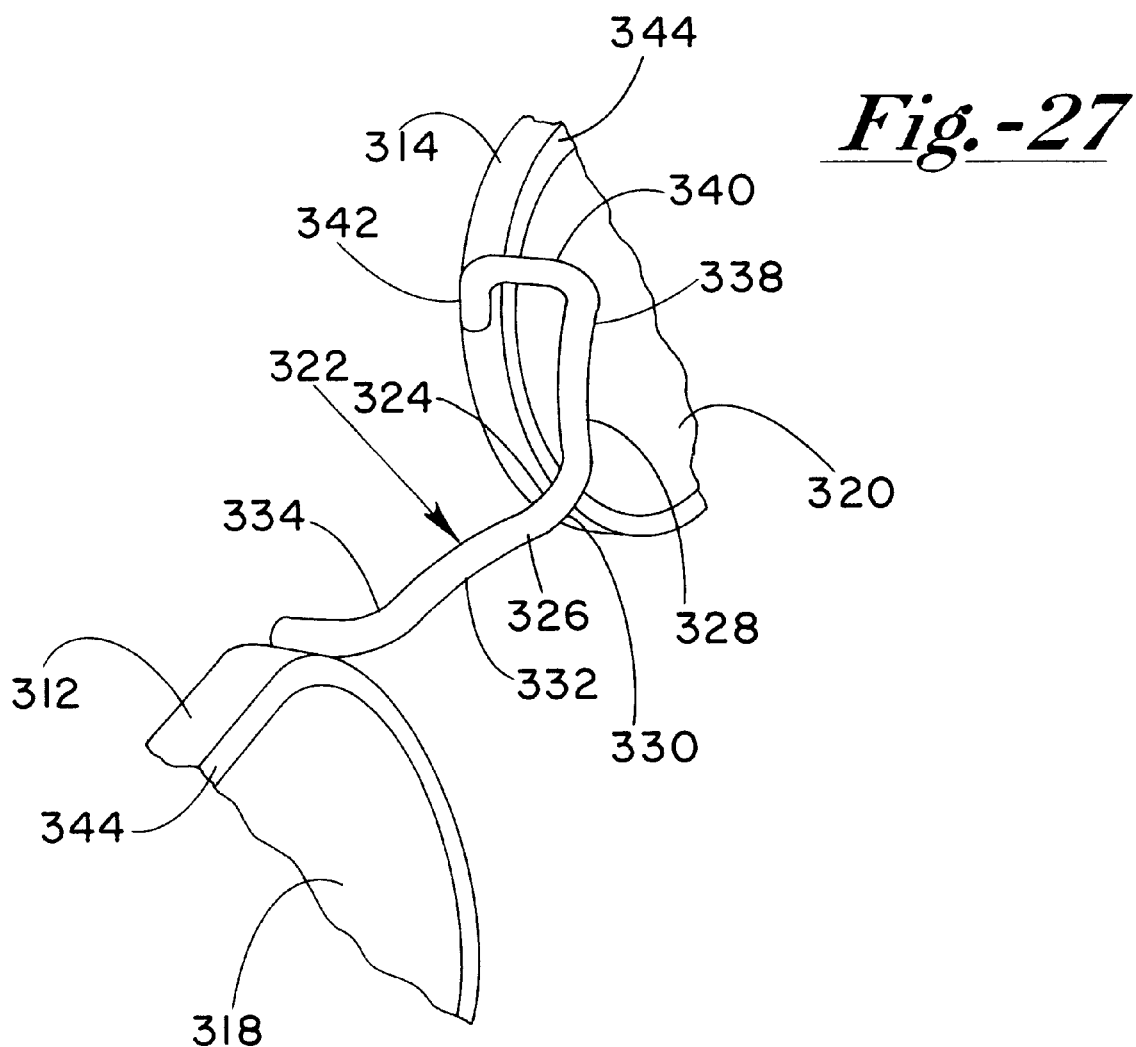
FIG. 27 is an enlarged fragmentary perspective view of a portion of the sunglasses of FIG. 23 and illustrating details of the bridge member.

The main body portion 322 of bridge member 316 is offset rearwardly of the back edge (rear surface) 344 of the eyewires 312 and 314, and thus, rearwardly of the back surfaces of the sunglass lenses (FIG. 27). The length of the upper arms 334 and 340 in this embodiment is greater than the length of the left arm 32 and right arm 36 of the sunglasses described in FIG. 5. The increased length of the upper arms 334 and 340, in combination with the orientation of angled member 330 of bridge member 316 enable this embodiment of clip-on sunglasses to be mounted behind the first or lower bridge element (bar) 212 of a pair of double bar eyeglasses (FIGS. 28–32).

Figure 24:
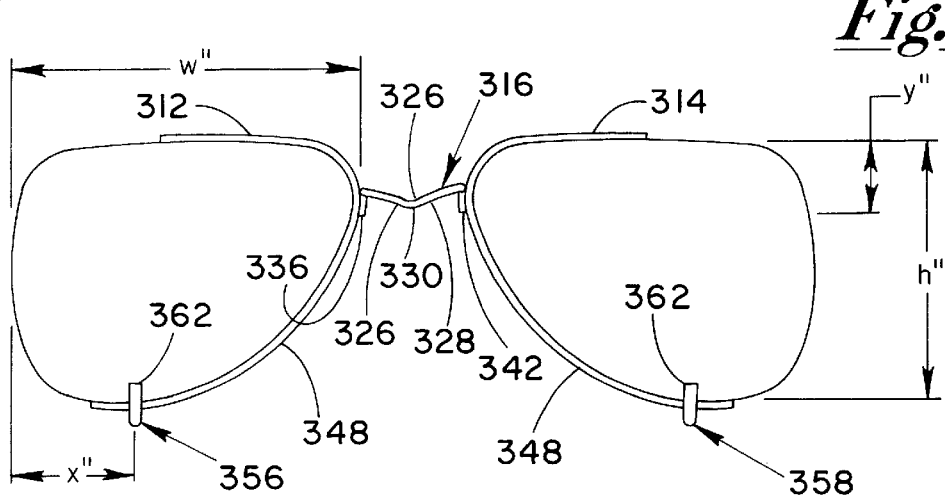
FIG. 24 is a rear view of the sunglasses of FIG. 23.
Figure 25:
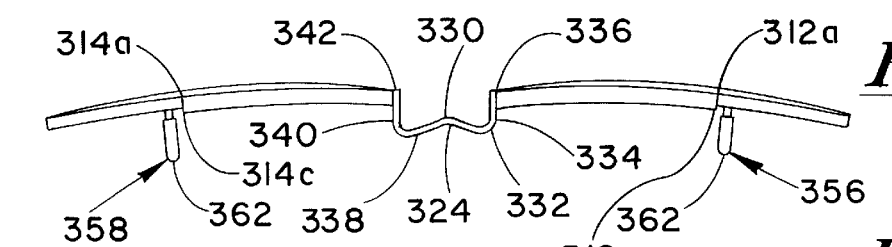
FIG. 25 is a top view of the sunglasses of FIG. 23.
Figure 26:
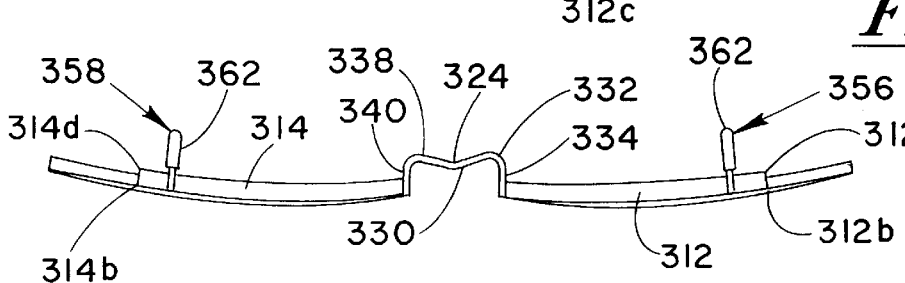
FIG. 26 is a bottom rear view of the sunglasses of FIG. 23.

As shown in the top perspective view in FIG. 25, the main body portion 322 and central body portion or dip 324 of bridge member 316 is bowed forwardly slightly, i.e., in a direction towards the back edges 344 of the eyewires, at its middle as indicated by angled member or vertex 330. In addition to being bowed slightly forward, angled member or vertex 330 is angled downward, i.e., beneath the plane defined by the middle arms 332 and 338, which as shown in the embodiment illustrated in the drawings (FIGS. 23 and 24).

The bridge member 316 is mounted to the eyewires at locations proximate the ends of the upper edges 346 and the lower edges 348 of the eyewires 312 and 314. In this embodiment, the bridge member 316 is connected to the eyewires at about three-eighths of an inch from the end of upper edge 346, and the bridge member 316 lies in a plane extending below a plane defined by the upper ends 370 of the eyewires 312 and 314.

The distance between the main body of the bridge member 316 and the back of the sunglass lenses and combination of the angled member 330 provides an increased gap which allows this embodiment of the clip-on sunglasses to be used on a wider variety of eyeglass frames than the embodiment shown in FIGS. 1–5.

In this embodiment, similar to the second embodiment, the left 312 and right 314 eyewires partially enclose left 318 and right 320 sunglass lenses, giving the appearance of a partial frame. The respective left 318 and right 320 sunglass lenses are attached to their respective left 312 and right 314 eyewires by a tensed wire 123 of nylon or the like, which completes the enclosure of the lenses. The tensed wire is not readily visible to a casual observer. Each sunglass lens 318 and 320 is attached to their respective eyewires 312 and 314 in a manner similar to the attachment of the sunglass lenses described for the second embodiment, where using a tensed wire 123 of nylon or the like, the ends of this tensed wire 123 are received in respective end openings 312a, 312b, 314a, and 314b along the respective eyewires, preferably at the ends 312c, 312d, 314c, and 314d thereof. The wires 123 are then affixed at these respective openings 312a, 312b, 314a, and 314b by conventional methods known to those skilled in the art, securing the left 318 and right 320 sunglasses to the left 312 and right 314 eyewires, respectively. This can include driving a fastener through the eyewire and into the lens, or other methods of attachment known to those skilled in the art.

A mounting clip 356 is secured to the left eyewire 312 at the lower edge 348 of left eyewire 312. Although in the embodiment shown in FIGS. 13 and 23, the clip is attached proximate an end of the eyewire 312, the mounting clip is preferentially attached to the sunglasses such that the position of the mounting clip is the approximate middle of the lower portion of the sunglass lens. A second mounting clip 358 is similarly secured to the right eyewire 314 at the lower edge 348 of right eyewire 314. The mounting clips comprise a short strip of metal having a free end 360 secured to the eyewires, and the other end 362 of the metal strip being bent upward so as to be able to engage the eyeglass lens assembly. As shown in the embodiment illustrated in FIG. 32 this can be a solid strip of metal, but this is for illustration only. The mounting clips have a protective coating 364, of rubber or silicone, for example, to guard against scratching the frame of the eyeglasses on which the sunglasses are mounted.

The eyewires 312 and 314 of the sunglass frame are made in the conventional manner, as has been described for the other embodiments of the present invention. The bridge member 316 is secured to the eyewires 312 and 314 by welding or any other suitable manner, to form the frame 310. The mounting clips 356 and 358 are formed in the conventional manner and secured to the eyewires by welding or another suitable manner known to those skilled in the art. In this embodiment, the frame, the bridge member, and the mounting clips are made of a base metal, such as monel metal, stainless steel, titanium, or nickel, and plated with gold, silver, stainless steel, nickel, or titanium, for example. Although preferably the eyewires, the bridge, and the mounting clips are made of metal, the eyewires, the bridge, and the mounting clips can be made of non-metal materials, such as zyl, for example.

FIG. 24 refers to an embodiment of the sunglasses that was constructed, the width "w" of the sunglass lenses 318 and 320 was approximately 2 inches. The top to bottom dimension "h" of the sunglass lens was approximately 1.9 inches. The distance "y" from the top edge 346 to the location of the points at where the bridge member 316 is secured to the eyewires was approximately 0.5 inch. The distance "x" from the outer edge of the sunglass lens to the points at which the mounting clips 356 and 358 are attached to the eyewires was approximately 0.8 inch. The length of the main body portion 322 of the bridge member 316 was approximately 0.6 inch, and the length of the arm portions 334 and 340 was approximately one-quarter inch so that the main body portion of the bridge member was offset rearwardly approximately one-quarter inch relative to the rear edge 344 of the eyewires 312 and 314. The length of the mounting clips 356 and 358 was approximately ⅜ inch, so that the upturned ends 362 thereof were located rearwardly approximately ⅜ inch from the rear edges 344 of the eyewires 312 and 314. The eyewires in this embodiment do not extend completely around each sunglass lens (FIG. 23). These dimensions are given by way of illustration of one particular embodiment and are not intended as a limitation of the scope of the invention as defined by the appended claims. Moreover, although a particular shape and size has been illustrated in the drawings, the sunglasses can be made in different shapes and sizes to more closely conform to the shape and size of the eyeglasses with which they are used.

FIGS. 28–32 show the sunglasses 300 mounted on the double bridge eyeglasses 200. The methods for mounting and removing sunglasses 300 to and from the eyeglasses; 200 are in accordance with those described above for the sunglasses 100 of the second embodiment. Upper bridge element 216 can be used by the wearer as a support to help attaching or removing the sunglasses 300 from the eyeglasses 200. Upper bridge element 216 does not interfere with the attachment of this embodiment of the sunglasses to double bridge eyeglasses. The upper bridge element 216 is not shown in FIG. 30 for purposes of clarity.

As is shown in FIGS. 28–32, when the sunglasses 300 are mounted on the eyeglasses 200, the bridge member 316 is juxtaposed with the lower bridge element 212 of the eyeglasses rather than extending above the eyeglasses, as is the case for conventional clip-on sunglasses. There are no mounting clips on the upper edge of the glasses. The bridge member 316 and the two mounting clips 356 and 358, that are located at the bottom of the lower edge near the middle thereof, secure the sunglasses to the eyeglasses behind lower bridge element 212. Central portion or dip 324 and angled member or vertex 330 are positioned behind lower bridge element 212 of the eyeglasses. Sunglasses 300 are thus mounted on double bridge eyeglasses 200 independently of the upper bridge element 216. The mounting clips 356 and 358 can be adjusted using a needle nose pliers to be bent inward or outward in the same manner as described above for the other embodiments of the present invention.

Figure 30:
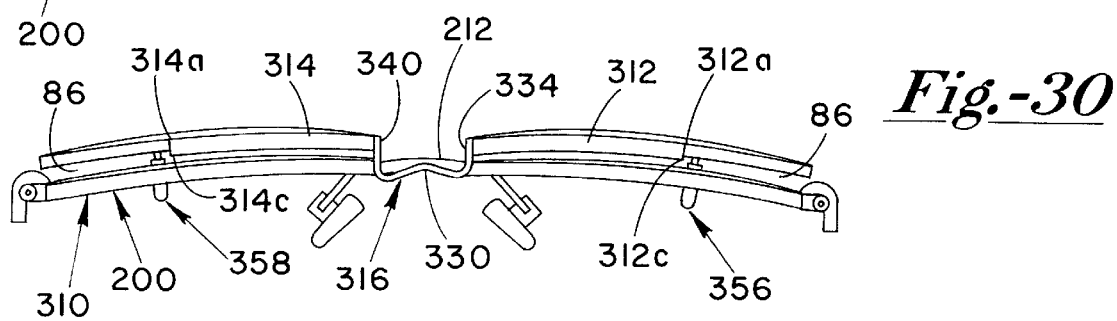
FIG. 30 is a top view of the assembly of FIG. 28 and illustrating the gap provided between the sunglass@ frame and the eyeglass frame.
Figure 31:
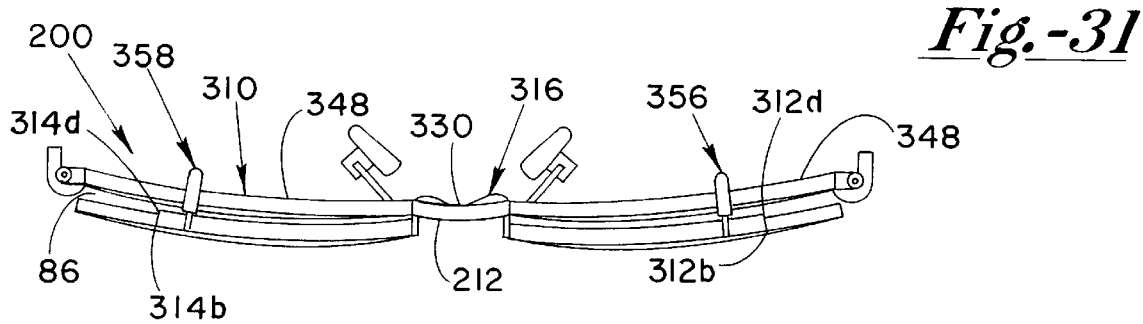
FIG. 31 is a bottom view of the assembly of FIG. 28.
Figure 32:
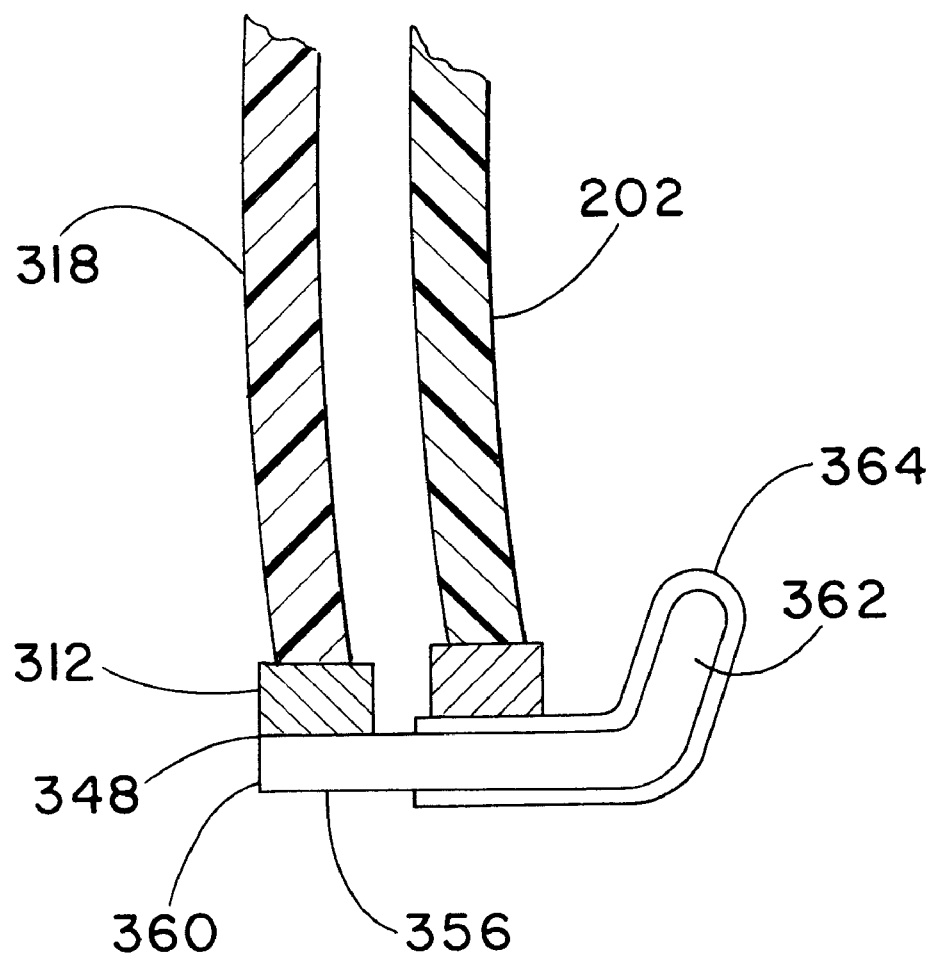
FIG. 32 is an enlarged vertical section view taken along the line 32—32 of FIG. 29.

As is shown in FIGS. 28–31, bridge member 316 of sunglasses 300 fits behind lower bridge element 212 of double bridge eyeglasses 200. The interaction of bridge member 316 with bridge element 212 is similar to the interaction of the bridge member 118 with bridge element 80 described above for the second embodiment of the present invention. The mounting clips 356 and 358 receive thus bottom edges 224 and 226 of the left and right eyewires 208 and 210, respectively. The rearward displacement of the bridge member 316 and the rearward extension of the mounting clips 356 and 358 enable the sunglass frame 312 to be spaced from the eyeglass frame 206 forming a gap 230 therebetween as shown in FIG. 30, for example. This enables the sunglasses 300 to be used with eyeglasses that have ultra thin lenses, eyeglasses that have relatively thick lenses, as well as eyeglasses having lenses which range in size from ultra thin lenses to relatively thick. The combination of the angled member or dip 330 of the bridge member 316 and the orientation of the bridge member 316 with respect to the lower bridge element 212 of the eyeglasses enables the sunglasses 300 of the present invention to be used with double bridge eyeglass frames, in contrast to the sunglasses described in the other embodiments.

Alternate embodiments of the second and third embodiments of the present invention shown in FIGS. 12–32, and described above, may have bridge members of dimensions (including angling with respect to the horizontal) for the main body portion, angled body portion or dip, angled member or vertex, arms, and mounting tabs differing from those shown. These alternate embodiment sunglasses could be modified in accordance with the above disclosure, to conform to various bridge elements of other specific eyeglasses, or either single or double bridge frames (including frameless or rimless styles) for which sunglasses in accordance with the present invention are desired. These inventions would be within the spirit and scope of the disclosed invention.

Thus, the present invention has provided clip-on type sunglasses in which the bridge portion of the sunglass frame is adapted to fit behind the bridge of the eyeglasses and/or engage the bridge of the eyeglasses on which the sunglasses are mounted, forming part of the mounting arrangement. The mounting arrangement also includes a pair of mounting clips, one located at the bottom of each eyewire, proximate the middle thereof. The mounting clips receive the lower edges of the frame of the eyeglasses on which the sunglasses are mounted. The use of the bridge portion of the sunglasses as part of the mounting arrangement eliminates the need for mounting clips no the upper portion of the sunglass frame and allows the sunglasses to better conform to the shape of the eyeglasses on which they are mounted. The use of the angled member of the bridge enables the sunglasses to be used on a wide variety of single bridge eyeglasses. Another embodiment of the sunglasses also has a bridge with an angled member and longer mounting arms enabling this embodiment to be used on eyeglasses having a double bridge frame.

What is claimed is:

1. A pair of clip-on type sunglasses adapted to be mounted on a pair of eyeglasses having first and second eyeglass lenses that are supported in a side-by-side relationship by a support means including a bridge element, said pair of sunglasses comprising:

a first lens assembly including a first sunglass tens, said first lens assembly having an upper edge, a lower edge, and a rear surface;

a second lens assembly including a second sunglass lens, said second lens assembly having an upper edge, a lower edge, and a rear surface;

a bridge member joining said first and second lens assemblies forming a unitary structure, said bridge member being constructed and arranged to extend between said first and second lens assemblies, located below a plane containing said upper edges of said first and second lens assemblies, wherein said bridge member comprises a monolithic element defining a main portion, said main portion further having a central portion which is oriented downward with respect to said main portion and angle inward with respect to said first and second lens assemblies, said main portion being able to accommodate said bridge element;

a first mounting clip secured to said first lens assembly at said lower edge of said first lens assembly; and a second mounting clip secured to said second lens assembly at said lower edge of said second lens assembly.

2. The sunglasses of claim 1, wherein said central portion further includes two lower arms, said lower arms joined to define an angled member, said angled member accommodating said bridge element, said central portion further adjoining a middle arm adjacent each said lower arm, an upper arm attached to each said middle arm, said upper arms defining a plane and attaching said bridge member to said lens assemblies.

3. The sunglasses of claim 2, wherein said angled member is further angled forwardly towards said rear surfaces of said first and said second sunglass lenses.

4. The sunglasses of claim 3, wherein said angled member is V-shaped.

5. The sunglasses of claim 1, wherein said mounting clips have a protective coating.

6. The sunglasses of claim 5, wherein said protective coating is rubber.

7. A pair of clip-on type sunglasses adapted to be mounted on a pair of eyeglasses having first and second eyeglass lenses that are supported in a side-by-side relationship by a support means including a lower bridge element and an upper bridge element, said pair of sunglasses comprising:

a first lens assembly containing a first sunglass lens, said first lens assembly having an upper edge, a lower edge, and a rear surface;

a second lens assembly containing a second sunglass lens, said second lens assembly having an upper edge, a lower edge, and a rear surface;

a bridge member joining said first and second lens assemblies, said bridge member being constructed and arranged to extend between said first and second lens assemblies, located below a plane containing said upper edges of said first and second lens assemblies, said bridge member further comprising a main portion, said main portion further having a central portion which is oriented downward with respect to said main portion and angling rearward and inward with respect to said lens assemblies, said main portion being able to accommodate said lower bridge element;

a first mounting clip secured to said first lens assembly at said lower edge of said first lens assembly; and a second mounting clip secured to said second lens assembly at said lower edge of said second lens assembly, whereby said bridge member is retained on said eyeglasses by said lower bridge element and said mounting clips, independent of said upper bridge element.

8. The sunglasses of claim 7 wherein said central portion further includes two lower arms, said lower arms joined to define an angled portion, said angled portion accommodating said lower bridge element, said central portion further adjoining a middle arm adjacent each said lower arm, an upper arm attached to each said middle arm, said upper arms defining a plane and attaching said bridge member to said lens assemblies.

9. The sunglasses of claim 8, wherein said angled portion of said bridge member is angled forwardly towards said rear surfaces of said first and second leans assemblies, and wherein said first and second mounting clips project rearwardly from said rear surfaces beyond said main portion of said bridge member.

10. The sunglasses of claim 7, wherein said mounting clips have a protective coating.

11. The sunglasses of claim 10, wherein said protective coating is rubber.

12. A pair of clip-on type sunglasses adapted to be mounted on a pair of eyeglasses having first and second eyeglass lenses that are supported in a side-by-side relationship by a support means including a bridge element, said pair of sunglasses comprising:

a first lens assembly including a first sunglass lens having an upper edge, a lower edge, a front and a back;

a second lens assembly including a second sunglass lens having an upper edge, a lower edge, a front and a back;

a bridge member joining said first and second lens assemblies forming a monolithic structure, said bridge member being constructed and arranged to extend between said first and second lens assemblies, located below a plane containing said upper edges of said first and second lens assemblies, said bridge member further comprising a main portion, said main portion further having a central portion which is oriented downward with respect to said main portion, said main portion being able to accommodate said bridge element;

said first lens assembly including a first mounting clip located at said lower edge of said first lens assembly and near the middle of said lower edge and extending from said back of said first lens assembly; and said second lens assembly including a second mounting clip located at the lower edge of said second lens assembly and near the middle of said lower edge and extending from said back of said second lens assembly.

13. The sunglasses of claim 12, wherein said central portion further includes two lower arms, said lower arms joined to define an angled member, said angled member accommodating said bridge element, said central portion further adjoining a middle arm adjacent each said lower arm, an upper arm attached to each said middle arm, said upper arms defining a plane and attaching said bridge member to said lens assemblies.

14. The sunglasses of claim 13, wherein said angled member of said bridge member is bowed inwardly toward said backs of said first and second lens assemblies.

15. The sunglasses of claim 12, wherein said mounting clips have a protective coating.

16. The sunglasses of claim 15, wherein said protective coating is rubber.

17. The sunglasses of claim 12, wherein said first and second lens assemblies comprises first and second eyewires, respectively.

18. The sunglasses of claim 17, wherein said first and second mounting clips are secured to said first and second eyewires, respectively, and extend rearwardly thereof.

* * * * *